United States Patent [19]

Ishidoya et al.

[11] Patent Number: 5,319,024
[45] Date of Patent: Jun. 7, 1994

[54] THERMOSETTING COMPOSITIONS, THERMAL LATENT HYDROXYL COMPOUNDS, THERMAL LATENT THIOL COMPOUNDS AND METHODS OF PREPARATION THEREOF

[75] Inventors: Masahiro Ishidoya, Kamakura; Kishio Shibato, Yokohama; Keiji Komoto, Tokyo; Kenji Shibamoto; Yoshinori Nakane, both of Yokohama, all of Japan

[73] Assignee: Nippon Oil and Fats Company, Limited, Tokyo, Japan

[21] Appl. No.: 683,301

[22] Filed: Apr. 10, 1991

[30] Foreign Application Priority Data

Apr. 19, 1990 [JP] Japan ................... 2-103888
Sep. 28, 1990 [JP] Japan ................... 2-259696
Oct. 30, 1990 [JP] Japan ................... 2-292659
Apr. 5, 1991 [JP] Japan ................... 3-100534

[51] Int. Cl.$^5$ ............................................. C08F 8/30
[52] U.S. Cl. ..................... 525/123; 525/125; 525/130; 525/192
[58] Field of Search ............... 525/123, 125, 130, 192

[56] References Cited

U.S. PATENT DOCUMENTS

| 3,530,167 | 9/1970 | Dowbenko . | |
| 3,625,926 | 12/1971 | Dowbenko | 260/78.5 B |
| 3,842,019 | 10/1974 | Kropp . | |
| 4,271,277 | 6/1981 | Golownia | 525/351 |
| 4,581,436 | 4/1986 | Corley | 528/90 |

FOREIGN PATENT DOCUMENTS

| 0318880 | 6/1989 | European Pat. Off. . |
| 855864 | 11/1952 | Fed. Rep. of Germany . |
| 1089271 | 11/1967 | United Kingdom . |
| 2011423 | 7/1979 | United Kingdom . |

OTHER PUBLICATIONS

Patent Abstracts of Japan, vol. 14, No. 211 (C-071) May 2, 1990, of JP 2-047119, Feb. 16, 1990.
Methoden der Organischen chemie (Houben-/weyl) 1965 vol. VI/3 Sauerstoffverbindungen I part 3, pp. 229-230 and 286-287.

Primary Examiner—Melvyn I. Marquis
Assistant Examiner—Helen F. Lee
Attorney, Agent, or Firm—Frishauf, Holtz, Goodman & Woodward

[57] ABSTRACT

Thermosetting compositions which are excellent in storage stability, useful as one component thermosetting compositions, give cured products having excellent chemical properties, physical properties and weathering resistance and favorably utilized in coating compositions, ink, adhesive and molded plastics. The thermosetting compositions comprises a compound having in the molecule two or more hydroxyl groups and/or thiol groups blocked by a vinyl ether compound, a vinyl thioether compound or a heterocyclic compound having a vinyl type double bond and oxygen or sulfur as the hetero atom, a compound having two or more reactive functional groups which can form a chemical bond with the blocked hydroxyl and/or thiol compound by heating and a thermal latent acid catalyst. The blocked hydroxyl and/or thiol group of the first compound and the reactive functional group of the second compound may be comprised in the same molecule.

16 Claims, No Drawings

THERMOSETTING COMPOSITIONS, THERMAL LATENT HYDROXYL COMPOUNDS, THERMAL LATENT THIOL COMPOUNDS AND METHODS OF PREPARATION THEREOF

BACKGROUND OF THE INVENTION

1. Field of the Invention

The present invention relates to novel thermosetting compositions, thermal latent hydroxyl compounds, thermal latent thiol compounds and methods of preparation thereof. More particularly, the present invention relates to novel thermosetting compositions having excellent chemical properties, physical properties and weatherbility and exceptionally excellent storage stability and suitable for preparation of coating compositions, ink, adhesive and molded plastics, novel thermal latent hydroxyl compounds and novel thermal latent thiol compounds are utilized for the preparation of the thermosetting compositions and methods of effectively preparing the thermal latent compounds.

2. Description of the Prior Art

It is generally known that thermosetting compositions can be prepared from compounds having hydroxyl groups or thiol groups and compounds having reactive functional groups which can form chemical bonds with the hydroxyl groups or thiol groups by heating, such as epoxy group, carboxyl group, acid anhydride group, silanol group, alkoxysilane group, isocyanate group, blocked isocyanate group, cyclocarbonate group, vinyl ether group, vinyl thioether group, acryloyloxy group, methacryloyloxy group, aminomethylol group, alkylated aminomethylol group, acetal group and ketal group. The thermosetting compositions resulting cured products having excellent chemical properties, physical properties and weatherbility and are widely utilized in the field of coating compositions, ink, adhesive and molded plastics.

However, the reactivity between the hydroxyl groups or thiol groups and the reactive functional groups is generally very high and compositions in which compounds having the hydroxyl groups or thiol groups and compounds having the reactive functional groups are mixed together have problems that the composition is often gelatinized during storage and the period in which the composition can be utilized is short. Therefore, the composition is actually utilized by the form of a two component thermosetting composition in which components containing the said different kinds of functional groups each other are stored separately in individual vessels and the two components are mixed together immediately before use.

It is described in U.S. Pat. No. 3,530,167 that a compound in which a hydroxyl group is made into an acetal group can be utilized. However, an acetal group is used for the reaction of curing by itself in this method and utilization of thermal latent catalysts is not mentioned at all.

SUMMARY OF THE INVENTION

The present invention accordingly has an object to provide thermosetting compositions which resulting cured products having excellent chemical properties, physical properties and weatherbility at relatively low temperature, have excellent storage stability and can be utilized as one component compositions. Another object of the invention is to provide thermal latent hydroxyl compounds and thermal latent thiol compounds useful for the preparation of the thermosetting compositions. Still another object of the invention is to provide methods of preparation of the thermal latent hydroxyl compounds and the thermal latent thiol compounds.

Thus, the thermosetting compositions of the present invention comprise:

(A) a compound having in the molecule two or more functional groups of the general formula [1]:

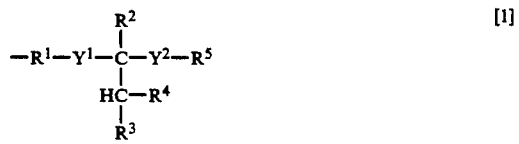

wherein $R^1$ is a bivalent organic group of 1 to 18 carbon atoms, $R^2$, $R^3$ and $R^4$ are respectively selected from the group consisting of a hydrogen atom and an organic group of 1 to 18 carbon atoms, $R^6$ is an organic group of 1 to 18 carbon atoms, $Y^1$ and $Y^2$ are respectively selected from the group consisting of an oxygen atom and a sulfur atom and $R^3$ and $R^5$ or $R^4$ and $R^5$ may be bonded with each other to form a heterocyclic structure which comprises $Y^2$ as the hetero atom component;

(B) a compound having in the molecule two or more reactive functional groups which can form a chemical bond with the functional groups of the compound (A) by heating; and (C) a thermal latent acid catalyst which is activated during curing of the composition by heating.

The thermosetting compositions of the present invention also comprise:

(D) a self-crosslinking compound having in the molecule (a) one or more functional groups of the general formula [2]:

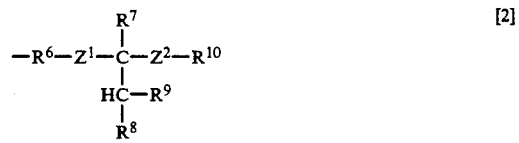

wherein $R^6$ is a bivalent organic group of 1 to 18 carbon atoms, $R^7$, $R^8$ and $R^9$ are respectively selected from the group consisting of a hydrogen atom and an organic group of 1 to 18 carbon atoms, $R^{10}$ is an organic group of 1 to 18 carbon atoms, $Z^1$ and $Z^2$ are respectively selected from the group consisting of an oxygen atom and a sulfur atom and $R^8$ and $R^{10}$ or $R^9$ and $R^{10}$ may be bonded with each other to form a heterocyclic structure which comprises $Z^2$ as the hetero atom component; and (b) one or more reactive functional groups which can form a chemical bond with the functional groups (a) by heating;

(C) essentially, a thermal latent acid catalyst which is activated during curing of the composition by heating;

(A) optionally, a compound having in the molecule two or more functional groups of the general formula [1]:

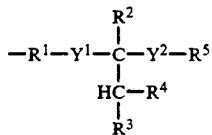

$$-R^1-Y^1-\underset{\underset{R^3}{|}}{\underset{HC-R^4}{|}}\overset{\overset{R^2}{|}}{C}-Y^2-R^5 \qquad [1]$$

wherein $R^1$ is a bivalent organic group of 1 to 18 carbon atoms, $R^2$, $R^3$ and $R^4$ are respectively selected from the group consisting of a hydrogen atom and an organic group of 1 to 18 carbon atoms, $R^5$ is an organic group of 1 to 18 carbon atoms, $Y^1$ and $Y^2$ are respectively selected from the group consisting of an oxygen atom and a sulfur atom and $R^3$ and $R^5$ or $R^4$ and $R^5$ may be bonded with each other to form a heterocyclic structure which comprises $Y^2$ as the hetero atom component; and/or, (B) optionally, a compound having in the molecule two or more reactive functional groups which can form a chemical bond by heating with either one or both of the functional group of the general formula [1] and the functional group of the general formula [2].

The thermal latent compounds which are either the thermal latent hydroxyl compounds or the thermal latent thiol compounds are prepared by reaction of a polyol compound or a polythiol compound having two or more hydroxyl groups or thiol groups in the molecule, hydroxyl equivalent or thiol equivalent of not more than 1000 g/mole and number average molecular weight of not more than 4000 with a vinyl ether compound, whereby the hydroxyl groups or the thiol groups are transformed into blocked hydroxyl groups or blocked thiol groups of the general formula [3]:

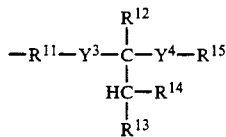

$$-R^{11}-Y^3-\underset{\underset{R^{13}}{|}}{\underset{HC-R^{14}}{|}}\overset{\overset{R^{12}}{|}}{C}-Y^4-R^{15} \qquad [3]$$

wherein $R^{11}$ is a bivalent organic group of 1 to 18 carbon atoms, $R^{12}$, $R^{13}$ and $R^{14}$ are respectively selected from the group consisting of a hydrogen atom and an organic group consisting of 1 to 18 carbon atoms, $R^{15}$ is an organic group of 1 to 18 carbon atoms, $Y^3$ and $Y^4$ are respectively selected from the group consisting of an oxygen atom and a sulfur atom and $R^{13}$ and $R^{15}$ or $R^{14}$ and $R^{15}$ may be bonded with each other to form a heterocyclic structure which comprises $Y^4$ as the hetero atom component.

The method of preparation of the thermal latent compounds is characterized in that a polyol compound or a polythiol compound having two or more hydroxyl groups or thiol groups in the molecule, hydroxyl equivalent or thiol equivalent of not more than 1000 g/mole and number average molecular weight of not more than 4000 is made to react with a vinyl ether compound.

Other and further objects, features and advantages of the invention will appear more fully from the following description.

DESCRIPTION OF THE PREFERRED EMBODIMENTS

Extensive studies were made by the present inventors to develop a novel thermosetting composition to achieve the objects and it was discovered that the following compositions were effective.

One of the compositions discovered comprises, as the essential components: (A) a compound having in the molecule two or more hydroxyl groups and/or thiol groups, which are blocked by a specific vinyl ether group, vinyl thioether group or heterocyclic compound having a vinyl type double bond and oxygen or sulfur as the hetero atom component; (B) a compound having in the molecule two or more reactive functional groups which can form a chemical bond with the blocked hydroxyl groups or thiol groups and (C) a thermal latent acid catalyst which is activated during curing by heating.

Another of the compositions discovered comprises: (D) a self-crosslinking compound having in the molecule one or more blocked hydroxyl groups and/or blocked thiol groups and one or more reactive functional groups which can form a chemical bond with the blocked hydroxyl and/or thiol groups by heating and the said compound (C) as the essential components. The composition may optionally comprise the said compound (A) and/or the said compound (B).

It was also discovered that the thermal latent hydroxyl compound and/or thiol compound giving the thermosetting composition having the advantageous properties could be prepared by reaction of a specific low molecular weight polyol compound and/or polythiol compound with a vinyl ether compound to block the hydroxyl group and/or thiol group of the polyol compound and/or polythiol compound.

The present invention was completed on the basis of the discovery described above.

Thus, the thermosetting compositions of the present invention comprise:

(A) a compound having in the molecule two or more functional groups of the general formula [1]:

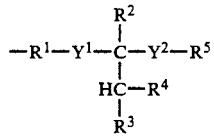

$$-R^1-Y^1-\underset{\underset{R^3}{|}}{\underset{HC-R^4}{|}}\overset{\overset{R^2}{|}}{C}-Y^2-R^5 \qquad [1]$$

wherein $R^1$ is a bivalent organic group of 1 to 18 carbon atoms, $R^2$, $R^3$ and $R^4$ are respectively selected from the group consisting of a hydrogen atom and an organic group of 1 to 18 carbon atoms, $R^5$ is an organic group of 1 to 18 carbon atoms, $Y^1$ and $Y^2$ are respectively selected from the group consisting of an oxygen atom and a sulfur atom and $R^3$ and $R^5$ or $R^4$ and $R^5$ may be bonded with each other to form a heterocyclic structure which comprises $Y^2$ as the hetero atom component;

(B) a compound having in the molecule two or more reactive functional groups which can form a chemical bond with the functional groups of the compound (A) by heating; and (C) a thermal latent acid catalyst which is activated during curing of the composition by heating.

The thermosetting compositions of the present invention also comprise:

(D) a self-crosslinking compound having in the molecule (a) one or more functional groups of the general formula [2]:

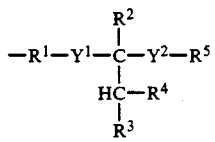  [2]

wherein $R^6$ is a bivalent organic group of 1 to 18 carbon atoms, $R^7$, $R^8$ and $R^9$ are respectively selected from the group consisting of a hydrogen atom and an organic group of 1 to 18 carbon atoms, $R^{10}$ is an organic group of 1 to 18 carbon atoms, $Z^1$ and $Z^2$ are respectively selected from the group consisting of an oxygen atom and a sulfur atom and $R^8$ and $R^{10}$ or $R^9$ and $R^{10}$ may be bonded with each other to form a heterocyclic structure which comprises $Z^2$ as the hetero atom component; and (b) one or more reactive functional groups which can form a chemical bond with the functional groups (a) by heating;

(C) essentially, a thermal latent acid catalyst which is activated during curing of the composition by heating;

(A) optionally, a compound having in the molecule two or more functional groups of the general formula [1]:

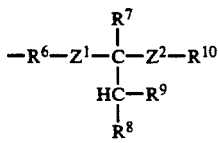  [1]

wherein $R^1$ is a bivalent organic group of 1 to 18 carbon atoms, $R^2$, $R^3$ and $R^4$ are respectively selected from the group consisting of a hydrogen atom and an organic group of 1 to 18 carbon atoms, $R^5$ is an organic group of 1 to 18 carbon atoms, $Y^1$ and $Y^2$ are respectively selected from the group consisting of an oxygen atom and a sulfur atom and $R^3$ and $R^5$ or $R^4$ and $R^5$ may be bonded with each other to form a heterocyclic structure which comprises $Y^2$ as the hetero atom component; and/or, (B) optionally, a compound having in the molecule two or more reactive functional groups which can form a chemical bond by heating with either one or both of the functional group of the general formula [1] and the functional group of the general formula [2].

The thermal latent compounds which are either the thermal latent hydroxyl compounds or the thermal latent thiol compounds are prepared by reaction of a polyol compound or a polythiol compound having two or more hydroxyl groups or thiol groups in the molecule, hydroxyl equivalent or thiol equivalent of not more than 1000 g/mole and number average molecular weight of not more than 4000 with a vinyl ether compound, whereby the hydroxyl groups or the thiol groups are transformed into blocked hydroxyl groups or blocked thiol groups of the general formula [3]:

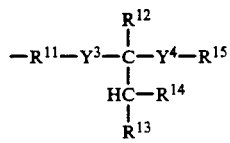  [3]

wherein $R^{11}$ is a bivalent organic group of 1 to 18 carbon atoms, $R^{12}$, $R^{13}$ and $R^{14}$ are respectively selected from the group consisting of a hydrogen atom and an organic group of 1 to 18 carbon atoms, $R^{15}$ is an organic group of 1 to 18 carbon atoms, $Y^3$ and $Y^4$ are respectively selected from the group consisting of an oxygen atom and a sulfur atom and $R^{13}$ and $R^{15}$ or $R^{14}$ and $R^{15}$ may be bonded with each other to form a heterocyclic structure which comprises $Y^4$ as the hetero atom component.

The method of preparation of the thermal latent compound is characterized in that a polyol compound or a polythiol compound having two or more hydroxyl groups or thiol groups in the molecule, hydroxyl equivalent or thiol equivalent of not more than 1000 g/mole and number average molecular weight of not more than 4000 is made to react with a vinyl ether compound.

The invention is described in more detail in the following.

The compound (A) in the thermosetting composition of the invention has in the molecule two or more, preferably 2 to 50, more preferably 2 to 20, functional groups of the following general formula [1]:

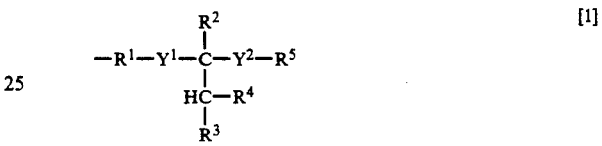  [1]

wherein $R^1$, $R^2$, $R^3$, $R^4$, $R^5$, $Y^1$ and $Y^2$ are the same as described before.

The functional group of the general formula [1] is easily prepared by reaction of a hydroxyl group and/or a thiol group of the formula [4]:

  [4]

wherein $R^1$ and $Y^1$ are the same as described before, with a vinyl ether, a vinyl thioether or a heterocyclic compound having a vinyl type double bond and having oxygen or sulfur as the hetero atom which has the general formula [5]:

  [5]

wherein $R^2$, $R^3$, $R^4$, $R^5$ and $Y^2$ are the same as described before.

In the formula [1] and formula [4], $R^1$ is a bivalent group of 1 to 18 carbon atoms, such as alkylene group, arylene group, alkarylene group and the like, and may have substituted groups in the molecule.

In the formula [1] and formula [5], $R^2$, $R^3$ and $R^4$ are respectively selected from the group consisting of a hydrogen atom and an organic group, such as alkyl group, aryl group and alkaryl group of 1 to 18 carbon atoms, $R^5$ is an organic group, such as alkyl group, aryl group and alkaryl group of 1 to 18 carbon atoms. The organic groups may have substituted groups in the molecule and $R^3$ and $R^5$ or $R^4$ and $R^5$ may be bonded together to form a heterocyclic structure with or without substituents and having $Y^2$ as the hetero atom component.

Examples of the compound of the formula [5] are: aliphatic vinyl ethers, such as methyl vinyl ether, ethyl vinyl ether, isopropyl vinyl ether, n-propyl vinyl ether, n-butyl vinyl ether, isobutyl vinyl ether, 2-ethylhexyl vinyl ether, cyclohexyl vinyl ether and the like; aliphatic vinyl thioethers, such as methyl vinyl thioether, ethyl vinyl thioether, isopropyl vinyl thioether, n-propyl vinyl thioether, n-butyl vinyl thioether, isobutyl vinyl thioether, 2-ethylhexyl vinyl thioether, cyclohexyl vinyl thioether and the like; cyclic vinyl ethers, such as 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran-2-one, 3,4-dihydro-2-ethoxy-2H-pyran, sodium 3,4-dihydro-2H-pyran-2-carboxylate and the like; and cyclic vinyl thioethers, such as 2,3-dihydrothiophene, 3,4-dihydrothiophene, 2,3-dihydro-2H-thiopyran, 3,4-dihydro-2H-thiopyran, 3,4-dihydro-2-methoxy-2H-thiopyran, 3,4-dihydro-4,4-dimethyl-2H-thiopyran-2-one, 3,4-dihydro-2-ethoxy-2H-thiopyran, sodium 3,4-dihydro-2H-thiopyran-2-carboxylate and the like.

The compound (A) is prepared by the reaction of a compound having two or more, preferably 2 to 50, more preferably 2 to 20, hydroxyl groups and/or thiol groups in the molecule with the compound having the formula [5]. Examples of the compound having two or more hydroxyl groups which will be called the compound having polyfunctional hydroxyl groups and the compound having two or more thiol groups which will be called the compound having polyfunctional thiol groups are: polols, such as ethylene glycol, 1,2-propylene glycol, 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, tris-hydroxyethyl isocyanurate, dipentaerythritol and the like; addition products of the polyols with a lactone, such as γ-butyrolactone and ε-caprolactone and the like, by ring opening of the lactone; addition products of the polyols with an isocyanate, such as tolylene diisocyanate, diphenylmethane diisocyanate, hexamethylene diisocyanate, isophorone diisocyanate and the like, in excess amount of the alcohol; addition products of the polyhydric alcohol with a vinyl ether, such as ethylene glycol divinyl ether, polyethylene glycol divinyl ether, butanediol divinyl ether, pentanediol divinyl ether, hexanediol divinyl ether and the like, in excess amount of the alcohol; addition products of the polyhydric alcohol with an alkoxysilicone compound, such as KR-213 ®, KR-217 ®, KR-9218 ® (products of Shinetsu Chemical Co., Ltd.), in excess amount of the alcohol; compounds having a structure in which all or a part of hydroxyl groups of the compounds having polyfunctional hydroxyl groups are substituted by thiol groups; polyester resins, polyacrylic resins and polyvinyl alcohol resins which comprise two or more hydroxyl groups and/or thiol groups in the molecule; and the like other compounds.

The compound (A) can also be prepared by polymerization of the reaction product of the compound [5] with an α,β-unsaturated hydroxyl compound, such as 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, dipentaerythritol hexa(meth)acrylate, hexa(meth)acrylate of a compound formed by addition of dipentaerythritol with ε-caprolactone and the like, or with a corresponding α,β-unsaturated thiol compound. The compound (A) can also be prepared by copolymerization of the reaction product with an α,β-unsaturated compound having no functional groups. Examples of the α,β-unsaturated compound having no functional groups are: methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, cyclohexyl (meth)acrylate, 2-ethylhexyl (meth)acrylate, lauryl (meth)acrylate, stearyl (meth)acrylate, styrene, α-methylstyrene, p-vinyltoluene, acrylonitrile and the like.

The reaction of the compound [5] with the compound having polyfunctional hydroxyl groups or with the compound having polyfunctional thiol groups is generally performed at a temperature in the range from the room temperature to 100° C. in the presence of an acid catalyst.

Either a single kind of the compound (A) or a combination of two or more kinds of the compound (A) may be utilized in the invention.

The compounds (B) utilized in the thermosetting composition of the invention are compounds having in the molecule two or more, preferably from 2 to 50, more preferably 2 to 20, reactive functional groups which can form chemical bonds by the reaction with the regenerated free hydroxyl group or thiol group formed from the functional group [1] of the compound (A) by heating. The kind of the reactive functional group is not particularly limited so long as it satisfies the condition described herein. Preferable examples of the reactive functional group are: epoxy group, carboxyl group, acid anhydride group, silanol group, alkoxysilane group, isocyanate group, blocked isocyanate group, cyclocarbonate group, vinyl ether group, vinyl thioether group, acryloyloxy group, methacryloyloxy group aminomethylol group, alkyl substituted aminomethylol group, acetal group, ketal group and the like groups. The compounds (B) may have either a single kind or two or more kinds of the reactive functional groups in the molecule.

Examples of the compound of (B) are: compounds having epoxy groups, such as epoxy resins of the bisphenol type, alicyclic epoxy resins, homopolymers and copolymers of glycidyl (meth)acrylate, 3,4-epoxycyclohexylmethyl (meth)acrylate and the like compounds, polyglycidyl ether compounds and polyglycidyl ester compounds obtained by the reaction of epichlorohydrine with polycarboxylic acids or polyols and other like compounds; compounds having polyfunctional carboxyl groups, such as aliphatic polyfunctional carboxylic acids, aromatic polyfunctional carboxylic acids, alicyclic polyfunctional carboxylic acids, homopolymers and copolymers of acrylic acid, methacrylic acid, itaconic acid and the like, polyester resins having two or more carboxyl groups in the molecule, polybutadiene resins modified with maleic acid and the like other compounds; compounds comprising polyfunctional acid anhydride groups, such as polymers and copolymers of α,β-unsaturated acid anhydrides like maleic anhydride, itaconic anhydride and the like; compounds having a silanol group or an alkoxysilane group, such as condensation products of a compound of the formula [6]:

$$(R^{16})_n Si(OR^{17})_{4-n} \qquad [6]$$

wherein $R^{16}$ and $R^{17}$ are respectively selected from the group consisting of an alkyl group of 1 to 18 carbon atoms and an aryl group of 1 to 18 carbon atoms and n is 0, 1 or 2, homopolymers and copolymers of $\alpha,\beta$-unsaturated silane compounds, like acryloyloxypropyl-trimethoxysilane, methacryloyloxypropyltrimethoxysilane, methacryloyloxypropyl-tri-n-butoxysilane and the like, hydrolysis products of these compounds and the like; compounds having an isocyanate group, such as p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis-(phenyl isocyanate), lysine methyl ester diisocyanate, bis-(isocyanatoethyl) fumarate, isophorone diisocyanate, methyl cyclcohexyl diisocyanate, 2-isocyanatoethyl-2,6-diisocyanatohexanoate, biuret derivatives and isocyanurate derivatives of these isocyanates, adducts of these isocyanates and the compounds having polyfunctional hydroxyl groups and the like; compounds having blocked isocyanate group, such as compounds prepared by blocking the compounds comprising isocyanate group with phenols, lactams, active methylenes, alcohols, acid amides, imides, amines, imidazoles, ureas, imines, or oximes and the like compounds; compounds having a cyclocarbonate group, such as homopolymers and copolymers of 3-(meth)acryloyloxypropylene carbonate, compounds having a polyfunctional cyclocarbonate group prepared by the reaction of the compounds having epoxy group with carbon dioxide and the like; compounds having polyfunctional vinyl ether groups or polyfunctional vinyl thioether groups, such as compounds having polyfunctional vinyl ether groups prepared by the reaction of the compounds having polyfunctional hydroxyl groups or the compounds having polyfunctional carboxyl groups with halogenated alkyl vinyl ethers, polyfunctional vinyl ether compounds prepared by the reaction of hydroxyalkyl vinyl ethers with compounds having polyfunctional carboxyl groups or with the compounds having an isocyanate group, a copolymer of vinyloxyalkyl (meth)acrylates with $\alpha,\beta$-unsaturated compounds, vinyl thioethers corresponding to the vinyl ethers and the like; compounds having polyfunctional (meth)acryloyloxy groups, such as ethyleneglycol di(meth)acrylate, diethylene glycol di(meth)acrylate, triethyleneglycol di(meth)acrylate, polyethyleneglycol di(meth)acrylate, 1,4-butanediol di(meth)acrylate, 1,6-hexanediol di(meth)acrylate, neopentylglycol di(meth)acrylate, tetraethyleneglycol di(meth)acrylate, tetrapropyleneglycol di(meth)acrylate, tripropyleneglycol di(meth)acrylate, di(meth)acrylate of neopentylglycol hydroxypivalate, acetalglycol di(meth)acrylate, trimethylolpropane tri(meth)acrylate, pentaerythritol tetra(meth)acrylate, dipentaerythritol hexa(meth)acrylate, hexa(meth)acrylate of an adduct between dipentaerythritol and $\epsilon$-caprolactone and the like; compounds having aminomethylol groups or alkyl substituted aminomethylol groups, such as melamine formaldehyde resins, glycolyl formaldehyde resins, urea formaldehyde resins, homopolymers and copolymers of $\alpha,\beta$-unsaturated compounds having an aminomethylol group or an alkylated aminomethylol group and the like; compounds having acetal groups or ketal groups, such as polyfunctional acetal compounds or polyfunctional ketal compounds prepared by the reaction of polyfunctional ketones, polyfunctional aldehydes, polyfunctional vinyl ether compounds and the like compounds with alcohols or ortho acid esters, condensation products of the polyfunctional acetal compounds with polyols, homopolymers and copolymers of addition products of the vinyloxyalkyl (meth)acrylate with alcohols or ortho acid esters; and the like other compounds.

The compound (B) may be either a compound comprising a single kind of functional group, such as the compounds shown in the examples, or a compound comprising two or more kinds of functional group in the molecule. Two or more kinds of the compound (B) may be utilized in combination.

The thermosetting composition of the invention may comprise the compound (A) and the compound (B) or it may comprise compound (D) which is a self-crosslinking compound having (a) one or more, preferably from one to 50, more preferably from one to 20, functional groups of the formula [2]:

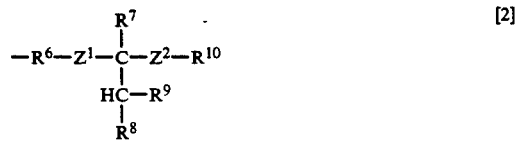

wherein $R^6$, $R^7$, $R^8$, $R^9$, $R^{10}$, $Z^1$ and $Z^2$ are the same as described before, and (b) one or more, preferably from one to 50, more preferably from one to 20, reactive functional groups which can form a chemical bond with the functional group (a) by heating. The thermosetting composition of the invention may also comprise the compound (D) and the compound (A) and/or the compound (B).

Examples of the functional group (a) of the formula [2] of the compound (D) are the same as the examples of the functional group of the formula [1] in the compound (A) already described. Examples of the reactive functional group (b) are the same as the examples of the reactive functional groups of compound (B).

The compound (D) can be prepared from a compound having one or more, preferably from one to 50, more preferably from one to 20, hydroxyl groups and/or thiol groups and one or more, preferably from one to 50, more preferably from one to 20, of the reactive functional groups in the molecule by using the same reaction as the reaction utilized in the preparation of the compound (A). The compound (D) can also be prepared by copolymerization of the $\alpha,\beta$-unsaturated compound having the functional group of the formula [2] and the $\alpha,\beta$-unsaturated compound having the reactive functional group.

The compound (D) has the functional group of formula [2] and, furthermore, may have two or more kinds of the reactive functional groups in the same molecule.

The functional groups of formulas [1] and [2] of the compound (A) and the compound (D) regenerate free hydroxyl groups and/or thiol groups under the heated condition and form chemical bonds with the reactive functional groups in the compound (B) and the compound (D). It is also possible that the functional groups of formulas [1] and [2] have addition reactions with the reactive functional groups of the compound (B) and the compound (D) caused by the highly polarized structure of the functional groups of formulas [1] and [2]. When the reaction of this kind takes place, the crosslinking reaction is not accompanied with any component leaving from the reacting system and the reaction system can contribute to the decrease of formation of volatiled organic compounds.

In the thermosetting composition of the invention, it is preferable that at least one of the compounds (A) and/or the compound (B) or at least one of the compound (D) and the compound (A) and/or the compound (B) which are utilized optionally is polymer of an α,β-unsaturated compound or a polyester resin. It is also preferable that the equivalent ratio of the blocked functional group in the composition and the reactive functional groups to form a chemical bond with the former functional groups by heating utilized in the thermosetting composition is adjusted in the range from 0.2:1.0 to 1.0:0.2.

In the present invention, it is necessary that a thermal latent acid catalyst (C) which shows activity in the curing condition at an elevated temperature is comprised in the thermosetting composition for the purpose of keeping excellent storage stability of the composition for a long period of time, promoting the curing reaction when the composition is cured in a short time at a rather low temperature and giving excellent chemical properties and physical properties to the cured products. It is preferable that the thermal latent acid catalyst is a compound which exhibits the activity at the temperature above 60° C. If the thermal latent acid catalyst shows the catalytic activity under 60° C., the prepared thermosetting composition has undesirable properties, such as increase of viscosity during storage and formation of gel.

Preferred examples of the thermal latent acid catalyst are compounds prepared by neutralizing a protonic acid with a Lewis base, compounds prepared by neutralizing a Lewis acid with a Lewis base or by mixing a Lewis acid with trialkyl phosphate, compounds of esters of sulfonic acids, compounds of esters of phosphoric acid and onium compounds.

Examples of the compound prepared by neutralizing a protonic acid with a Lewis base are: compounds prepared by neutralizing halogenocarboxylic acids, sulfonic acids, monoesters of sulfuric acid, monesters of phosphoric acid, diesters of phosphoric acid, esters of polyphosphoric acid, monoesters of boric acid, diesters of boric acid and the like compounds with ammonia, monoethylamine, triethylamine, pyridine, piperidine, aniline, morpholine, cyclohexylamine, n-butylamine, monoethanolamine, diethanolamine, triethanolamine and the like other amine compounds, trialkylphophine, triaryl phosphine, trialkyl phosphite, triarylphosphite, commercial acid-base blocked catalysts, such as Nacure 2500X ®, X-47-110 ®, 3525 ® and 5225 ® (products of King Industries Co., Ltd.) and other like compounds.

Examples of the compounds prepared by neutralizing a Lewis acid with a Lewis base are compounds prepared by neutralizing BF₃, FeCl₃, SnCl₄, AlCl₃, ZnCl₂ and other like Lewis acids with Lewis bases described above or by mixing Lewis acid with trialkyl phosphate.

The esters of sulfonic acids are compounds having the formula [7]:

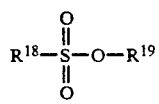

[7]

wherein $R^{18}$ is selected from the group consisting of a phenyl group, a substituted phenyl group, a naphthyl group, a substituted naphthyl group and an alkyl group and $R^{19}$ is a group of 3 to 18 carbon atoms selected from the group consisting of an alkyl group, an alkenyl group, an aryl group, an alkaryl group, an alkanol group and a saturated or unsaturated cycloalkyl or hydrocycloalkyl group which is bonded with a sulfonyloxy group through a primary or secondary carbon atom. Examples of the ester of sulfonic acid are esters of a sulfonic acid, such as methane sulfonic acid, ethane sulfonic acid, benzene sulfonic acid, dodecylbenzene sulfonic acid, naphthalene sulfonic acid, nonylnaphthalene sulfonic acid and other like sulfonic acids, with a primary alcohol, such as n-propanol, n-butanol, n-hexanol, n-octanol and the like, or a secondary alcohols, such as isopropanol, 2-butanol, 2-hexanol, 2-octanol, cyclohexanol and the like, and β-hydroxyalkylsulfonic esters prepared by the reaction of the sulfonic acids and compounds containing oxirane.

The esters of phosphoric acid are, for example, compounds of the formula [8]:

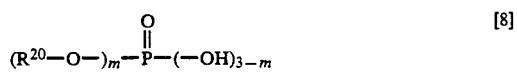

[8]

wherein $R^{20}$ is a group of 3 to 10 carbon atoms selected from the group consisting of an alkyl group, a cycloalkyl group and an aryl group and m is 1 or 2. Examples of the ester of phosphoric acid are monoesters and diesters of phosphoric acid with a primary alcohol, such as n-propanol, n-butanol, n-hexanol, n-octanol, 2-ethylhexanol and the like, or a secondary alcohol, such as isopropanol, 2-butanol, 2-hexanol, 2-octanol, cyclohexanol and the like.

The onium compound is a compound having one of the general formulas [9] through [12]:

  [9]

  [10]

  [11]

and

  [12]

wherein $R^{21}$ is a group of 1 to 12 carbon atoms selected from the group consisting of an alkyl group, an alkenyl group, an aryl group, an alkaryl group, an alkanol group and a cycloalkyl group, two $R^{21}$ may be bonded together to form a heterocyclic ring in which N, P, O or S is the hetero atom, $R^{22}$ is a hydrogen atom or a group of 1 to 12 carbon atoms selected from the group of alkyl group, alkenyl group, aryl group and alkaryl group and $X^-$ is selected from the group of $SbF_6^-$, $AsF_6^-$, $PF_6^-$ and $BF_4^-$.

In the thermosetting composition of the invention, either a single kind of the thermal latent acid catalyst (C) or a combination of two or more kinds may be utilized. The amount utilized is usually in the range from 0.01 to 10 weight parts per 100 weight parts of the total solid component which consists of the compound (A) and the compound (B) or compound (D) and optionally utilized compound (A) and/or compound (B).

Time and temperature required to cure the thermosetting composition of the invention is different depending on temperature at which free hydroxyl group or thiol group is regenerated from the blocked functional group of formula [1] or formula [2], kind of the reactive functional and kind of the thermal latent acid catalyst. In general, curing is completed by heating at the temperature in the range from 50° to 200° C. for the time in the range from 2 minutes to 10 hours.

The thermosetting composition of the invention can be utilized for coating compositions, ink, adhesive, molded plastics and the like without other ingredients and, according to the needs, it may be compounded with coloring pigments, fillers, solvents, ultraviolet light absorbents, antioxidants and other ingredients.

The present invention also provides the novel thermal latent hydroxyl compounds or thermal latent thiol compounds and the novel method of preparation thereof along with the thermosetting compositions described above. The thermal latent hydroxyl compounds or the thermal latent thiol compounds are compounds which are prepared by the reaction of a polyol compound or a polythiol compound having two or more, preferably 2 to 50, more preferably 2 to 20, hydroxyl groups or thiol groups in the molecule, hydroxyl equivalent or thiol equivalent of not more than 1000 g/mole and number average molecular weight of not more than 4000, preferably not more than 2000, with a vinyl ether compound, a vinyl thioether compound or a cyclic vinyl ether compound, such as a heterocyclic compound having vinyl type double bond and an oxygen atom or a sulfur atom as the hetero atom, of the formula [13]:

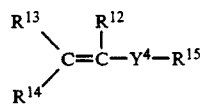

[13]

wherein $R^{12}$, $R^{13}$, $R^{14}$, $R^{15}$ and $Y^4$ are already defined before, in the presence of acid catalyst at the temperature of preferably in the range from the room temperature to 100° C. The hydroxyl group or thiol group is converted by the reaction to a blocked hydroxyl group or thiol group of the formula [3]:

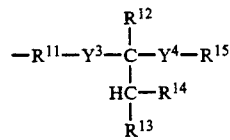

[3]

wherein $R^{11}$, $R^{12}$, $R^{13}$, $R^{14}$, $R^{15}$, $Y^3$ and $Y^4$ are already defined before.

When the number of hydroxyl group or thiol group in the molecule of polyol compound or polythiol compound utilized for the preparation of the thermal latent hydroxyl compounds or thiol compounds is less than two or when the hydroxyl equivalent or thiol equivalent of the polyol compound or polythiol compound is more than 1000 g/mole, curing of the prepared thermosetting composition may not proceed to a sufficient degree. When the number average molecular weight of the polyol compound or polythiol compound is more than 4000, viscosity of the thermosetting composition becomes high and processability is inferior.

Examples of the polyol compound and polythiol compound are the same as the examples of the compound (A) of the thermosetting composition.

Examples of the vinyl ether compound, the vinyl thioether compound or the cyclic vinyl ether compound, such as a heterocyclic compound having vinyl type double bond and an oxygen atom or a sulfur atom as the hetero atom, of the formula [13] are the same as the examples of the compound of formula [5] which is utilized for the preparation of the compound (A).

The thermal latent hydroxyl compound and the thermal latent polythiol compound can be advantageously utilized as the compound (A).

The invention will be understood more readily with reference to the following examples; however these examples are intended to illustrate the invention and are not to be construed to limit the scope of the invention.

Properties of the coated film were evaluated by the following methods.

(1) Resistance to acid-1

On a test piece, 2 ml of 40 weight % sulfuric acid was applied as spots and condition of the coated film was observed by visual comparison after standing for 8 hour at 20° C.

(2) Resistance to acid-2

On a test piece, 2 ml of 40 weight % sulfuric acid was applied as spots and condition of the coated film was observed by visual comparison after heating for 30 minutes at 40° C.

(3) Resistance to acid-3

A test piece was dipped in 0.1N sulfuric acid and the condition of coated film was observed by visual comparison after standing for 24 hours at 40° C.

(4) Impact resistance

By using an impact tester (Japanese Industrial Standard K-5400 (1979), method of 6.13.3 B), a test piece was clamped to an impact frame of 6.35 mm radius and a weight of 500 g was dropped from the height of 40 cm on the test piece. Damage made on the coating film was observed by visual comparison.

(5) Weathering resistance

By using a sunshine weathermeter (Japanese Industrial Standard B-7753), a test piece was exposed for 1000 hours or 3000 hours and 60 degree specular gloss (Japanese Industrial Standard K-5400 (1979) 6.7 60 degree specular gloss) of the coating film was measured. Condition of the coating film was observed by visual comparison or compared with the condition before the exposure by using the measured values of gloss.

(6) Knoop hardness

Measurement was made by using M type microhardnessmeter (manufactured by Shimazu Seisakusho, Co., Ltd.) at 20° C. A larger value shows a higher hardness.

(7) Non-volatile matter

Non-volatile matter was measured by treating the sample in vacuo of 0.1 mmHg at 50° C. for 3 hours.

(8) Gardener viscosity

Gardener viscosity was measured by the method of Japanese Industrial Standard K-5400 (1979) 4.2.2 (bubble tube viscometer).

(9) Yield of a reaction product was calculated from the values of analysis of the unreacted vinyl ether by gas chromatography.

Abbreviations and trade names used in the examples are listed in the following.
AIBN: 2,2'-azo-bis-isobutyronitrile
BMA: n-butyl methacrylate
EHA: 2-ethylhexyl acrylate
GMA: glycidyl methacrylate
IAAn: itaconic acid anhydride
IEM: isocyanatoethyl methacrylate
MMA: methyl methacrylate
TMSPMA: methacryloyloxypropyltrimethoxysilane
PTSA: p-toluene sulfonic acid DDBSA: dodecylbenzene sulfonic acid.

10% PTSA: 10 weight % solution of p-toluene sulfonic acid in isopropyl alcohol.

10% pyridine: 10 weight % solution of pyridine in xylene.

Acid catalyst A: xylene solution of (1-methylethyl) p-toluene sulfonate in Example of preparation of material 17.

Acid catalyst B: xylene solution of (1-methylheptyl) p-toluene sulfonate in Example of preparation of material 18.

Acid catalyst C: xylene solution of (1-methylethyl) dodecylbenzene sulfonate in Example of preparation of material 19.

Acid catalyst D: 10 weight % solution of di-2-ethylhexyl phosphate (a product of Wako Junyaku Co., Ltd.) in isobutanol.

Acid catalyst E: 10 weight % solution of triethylamine salt of zinc chloride in dimethylsulfoxide.

Acid catalyst F: 50 weight % solution of 3-methyl-2-butinyltetramethylenesulfonium hexafluoroantimonate in dichloroethane.

Acid catalyst G: 20 weight % solution of 4-methoxybenzylpyridinium hexafluoroantimonate in acetone.

C-1203 ®: Vesturit Catalyst 1203, a product of Impecs Chemicals Co., Ltd., nonionic thermal latent acid catalyst, non-volatile matter 50 weight %.

Coronate EH ®: a product of Nippon Polyurethane Industry Co., Ltd., trimer of hexamethylene diisocyanate, content of isocyanate 21 weight %.

Cymel 303 ®: a product of Mitsui Cyanamide Co., Ltd., methylated melamine resin, non-volatile matter 98 weight %.

Denacol EX-421 ®: a product of Nagase Kasei Kogyo Co., Ltd., a polyepoxy compound having epoxy equivalent of 155.

Flexorez UD 320 ®: a product of King Co., Ltd., urethanediol, non-volatile matter 97.5 weight %, hydroxyl value 350

K-Flex 188-50 ®: a product of King Co., Ltd., polyesterdiol, non-volatile matter 96 weight %, hydroxyl value 235

KR-214 ®: a product of Shinetsu Chemical Co., Ltd., silicone vanish, hydroxyl equivalent 490, non-volatile matter 70 weight %.

MAGME: MAGME 100 ®, a product of Mitsui Cyanamide Co., Ltd., methylacrylamide glycolate methyl ether Modaflow ®: a product of Monsanto Co., a leveling agent.

Penraerythritol tetrakis(thioglycolate): a product of Yodo's Chemical Co., Ltd., mercaptane equivalent 119.

Praccel 305 ®: a product of Daicel Chemical Industries Co., Ltd., olycaprolactone polyol, non-volatile matter 100%, hydroxyl value 235.

Praccel E-488 ®: a product of Daicel Chemical Industries Co., Ltd., caprolactone polyol, hydroxyl value 579.

Titanium dioxide JR-602 ®: a product of Teikoku Kako Co., Ltd., titanium dioxide of rutile type.

Three kinds of the compound (A), A-1, A-2 and A-3 were prepared.

EXAMPLE OF PREPARATION OF MATERIAL 1 THROUGH 3

A mixture shown in Table 1 was charged into a four-necked flask equipped with a thermometer, a reflux condenser, a stirrer and a dropping funnel and a mixture of vinyl ethers shown in Table 1 was dropped from the dropping funnel in 1.5 hours at a constant rate while the temperature of the charged mixture in the flask was kept at 35° C. After the reaction mixture was kept at 35° C. for further 4 hours under stirring, 21 g of sodium bicarbonate was added and the reaction was kept going for further 5 hours at 35° C. Excess amount of sodium bicarbonate was removed by filtration and excess amount of vinyl ethers was removed by distillation in vacuo. Thus, the compounds A-1 through A-3 were prepared as summarized in Table 1.

EXAMPLE OF PREPARATION OF MATERIAL 4 THROUGH 6

Three kinds of the compound (A), A-4 through A-6, were prepared in the following examples.

(1) Preparation of α,β-unsaturated compound

Into a four-necked flask equipped with a thermometer, a reflux condenser, a stirrer and a dropping funnel, 911.0 weight parts of 2-hydroxyethyl methacrylate and 1.8 weight part of 35 weight % hydrochloric acid were charged and the mixture was kept at 35° C. under heating and stirring. Then, 618.2 weight parts of 3,4-dihydro-2H-pyran in the Example of preparation material 4, 529.9 weight parts of ethyl vinyl ether in the Example of preparation of material 5 and 736.5 weight parts of butyl vinyl ether in the Example of preparation of material 6 were dropped into the mixture in 1.5 hours at a constant rate from the dropping funnel. After the the reaction mixture was kept at 35° C. under stirring for further 4 hours, 21 weight parts of sodium bicarbonate were added to the mixture and the mixture was kept at 35° C. for 5 hours. When the reaction was finished, the reaction mixture was treated by the same method as in Example of preparation of material 1 through 3 and α,β-unsaturated compounds were prepared by the following yields: A-4 (a) 92.3%; A-5 (a) 93.3%; and A-6 (a) 91.8%.

(2) Preparation of compounds A-4, A-5 and A-6

Into a four-necked flask equipped with a thermometer, a reflux condenser, a stirrer and a dropping funnel, an initial portion of solvent which was xylene was charged as shown in Table 2 and kept at 80° C. under heating and stirring. A mixture of monomers and the initiator (shown in Table 2 as 'composition of dropped mixture') was dropped into the mixture from the dropping funnel in 2 hours at 80° C. After finishing the dropping, the mixture was kept at 80° C. for 1 hour. Then, a solution of the initiator (shown in Table 2 as 'additional catalyst') was added to the reaction mixture and the reaction mixture was kept at 80° C. for 4 hours. When the reaction was finished, compounds A-4, A-5 and A-6 having the properties shown in Table 2 were prepared.

EXAMPLE OF PREPARATION OF MATERIAL 7 THROUGH 11

Five kinds of compound (B), compound B-1 through B-5 were prepared by the following method.

Into a four-necked flask equipped with a thermometer, a reflux condenser, a stirrer and a dropping funnel, 40.0 weight parts of solvent which was n-butyl acetate were charged and kept at 100° C. by heating under stirring. A mixture of monomers and the initiator (shown in Table 3 as 'composition of dropped mixture') was dropped into the mixture from the dropping funnel in 2 hours at 100° C. After finishing the dropping, the mixture was kept at 80° C. for 1 hour. Then, a solution of the initiator (shown in Table 3 as 'additional catalyst') was added to the reaction mixture and the reaction mixture was kept at 100° C. for 2 hours. When the reaction was finished, compounds B-1 through B-5 having the properties shown in Table 3 were prepared.

EXAMPLE OF PREPARATION OF MATERIAL 12

One kind of compound (B), compound B-6, was prepared by the following method.

Into a four-necked flask equipped with a thermometer, a reflux condenser and a stirrer, the following components were charged and kept under 100° C. and stirring. The acid value of the reaction mixture in the flask was measured from time to time and the reaction was finished when the acid value decreased to a value not more than 2. The compound B-6 having content of non-volatile matter 50.8% and Gardener viscosity Y-Z was prepared.

| | |
|---|---|
| Compound B-5 of Example of preparation of material 11 | 100.0 weight parts |
| acrylic acid | 7.2 weight parts |
| hydroquinone | 0.1 weight parts |
| N,N-dimethylbenzylamine | 0.1 weight parts |
| xylene | 7.0 weight parts |

EXAMPLE OF PREPARATION OF MATERIAL 13

One kind of compound (B), compound B-7, was prepared by the following method.

Into a four-necked flask equipped with a thermometer, a reflux condenser, a stirrer and a dropping funnel, 206.0 weight parts of methyl orthoformate and 0.3 weight part of boron trifluoride diethyl etherate were charged and the mixture was kept at 0°-5° C. with stirring under cooling in an ice bath. To the mixture, 87.7 weight parts of butyl vinyl ether were added by dropping from a dropping funnel at a constant rate for 2 hours while temperature of the mixture was kept below 5° C. The mixture was kept below 5° C. for further 1 hour after finishing the dropping and, then, 0.4 weight part of 30 weight % methanol solution of sodium methylate was added to the mixture to finish the reaction. The acetal product obtained by distillation of the reaction product at 75°-80° C. (4 mmHg) contained 98 weight % of the effective component.

Into a four-necked flask equipped with a thermometer, a reflux condenser fitted with a Dienstag trap, a stirrer and a dropping funnel, 618 weight parts of the purified acetal product prepared above, 134 weight parts of trimethylolpropane and 4 weight parts of p-toluene sulfonic acid were charged and the mixture was kept at 90° C. by heating under stirring. Methanol was continuously removed while the reaction proceeded. When 96 weight parts of methanol were recovered, the reaction was finished and compound B-7 was obtained, of which content of non-volatile matter was 98 weight % and Gardener viscosity was X-Y.

EXAMPLE OF PREPARATION OF MATERIAL 14 THROUGH 16

Three kinds of compound (D), compounds D-1, D-2 and D-3, were prepare by the following method.

Into a four-necked flask equipped with a thermometer, a reflux condenser, a stirrer and a dropping funnel, an initial portion of solvent which was n-butyl acetate was charged in an amount shown in Table 4, heated under stirring and kept at 80° C. A mixture of monomers and a polymerization initiator shown in Table 4 ('composition of dropped mixture') was added by dropping to the solvent at 80° C. at a constant rate for 2 hours. When the addition of the dropping composition was finished, the mixture was kept at 80° C. for further 1 hour and, then, an additional amount of initiator solution shown in Table 4 ('additional catalyst') was added to the mixture. The mixture was kept at 80° C. for 4 hours before finishing the reaction and finally the compounds D-1, D-2 and D-3 having the properties shown in Table 4 were obtained.

EXAMPLE OF PREPARATION OF MATERIAL 17

Thermal latent acid catalyst (C) was prepared by the following method.

Into a flask equipped with a stirrer, a thermometer, a dropping funnel and a reflux condenser, 315 weight parts of 2-propanol were charged and the flask was cooled by an ice bath. Potassium t-butoxide, 44.9 weight parts, was added to 2-propanol to dissolve in it and a solution of 53.4 weight parts of p-toluene sulfonyl chloride in 300 weight parts of diethyl ether were added to the solution by dropping in 30 minutes. After one hour, the ice bath was removed from the flask and the reaction was continued for further 1 hour. After the reaction was finished, the reaction mixture was washed with 300 weight parts of water three times and dried with Molecular Sieve 4A1/16 (a product of Wako Junyaku Co., Ltd.). After removing the solvent by using an evaporater, 40 weight parts of 1-methylethyl p-toluene sulfonate were obtained (yield 67%). The thermal latent acid catalyst thus prepared was dissolved in 238 weight parts of xylene to form a solution of 10 weight % based on p-toluene sulfonic acid.

EXAMPLE OF PREPARATION OF 18 AND 19

In the Example of preparation of material 18, 2-octanol was used in place of 2-propanol in the Example of preparation of material 17. In the Example of preparation of material 19, dodecylbenzene sulfonyl chloride was used in place of p-toluene sulfonyl chloride in the Example of preparation of material 17. Other procedures were made in the same way as the Example of preparation of material 17. In the Example of preparation of material 18, 1-methylheptyl p-toluene sulfonate was obtained in the yield of 72% and, in the Example of preparation of material 19, 1-methylethyl dodecylbenzene sulfonate was obtained in the yield of 83%.

The thermal latent acid catalysts thus prepared were dissolved in xylene to form a solution of 10 weight % based on p-toluene sulfonic acid or dodecylbenzene sulfonic acid in the same way as in the Example of preparation of material 17.

Thermal latent hydroxyl compounds and thermal latent thiol compounds were prepared by the following methods.

EXAMPLE OF PREPARATION OF MATERIAL 20

Polyol compound A was prepared by the following method.

Into a four-necked flask equipped with a thermometer, a reflux condenser fitted with a Dienstag trap and a stirrer, 480.0 weight parts of Silicone KR-213® (a product of Shinetsu Chemical Industry Co., Ltd., a methoxysilicone compound, methoxy equivalent 160), 312.0 weight parts of neopentyl glycol and 0.8 weight parts of p-toluene sulfonic acid were charged and kept at 160° C. under heating and stirring. When the reaction started, methanol was removed from the reaction system at temperatures above 140° C. After the reaction was continued until 96 weight parts of methanol was recovered, polyol compound A having 95 weight % of non-volatile matter and 242 of hydroxyl value was prepared.

EXAMPLE OF PREPARATION OF MATERIAL 21

Polyol compound B was prepared by the following method.

In a flask equipped with a stopper, 268.0 weight parts of trimethylolpropane, 224 weight parts of 3,4-dihydro-2H-yl-methyl-3,4-dihydro-2H-pyran-2-carboxylate and 0.4 weight part of dodecylbenzene sulfonic acid were charged and stirred at the room temperature for 24 hours. Thus, polyol compound B having 96% of non-volatile matter and 456 of hydroxyl value was prepared.

EXAMPLES 1 THROUGH 6

Into a four-necked flask equipped with a thermometer, reflux condenser, a stirrer and a dropping funnel, a mixture having the components shown in Table 5 was charged and a vinyl ether compound shown in Table 5 was dropped into the mixture at a constant rate in 1.5 hours from the dropping funnel at a constant temperature of 35° C. When the dropping was finished, the mixture was further stirred at 35° C. for 4 hours. Then, 6 weight parts of sodium bicarbonate were added to the mixture and the reaction was continued at 35° C. for further 5 hours. Sodium bicarbonate was removed by filtration and the remaining vinyl ether compounds were removed by distillation in vacuo. Thermal latent hydroxyl compounds [1] through [5] and a thermal latent thiol compound [6] were prepared in the yields shown in Table 5.

EXAMPLE 7 AND 8

(1) Preparation of α,β-unsaturated compounds

Into a flask, equipped with a thermometer, a reflux condenser, a stirrer and a dropping funnel, 911.0 weight parts of 2-hydroxyethyl methacrylate and 1.8 weight parts of 35% hydrochloric acid were charged and kept at 35° C. under heating and stirring. In Example 7, 618.2 weight parts of 3,4-dihydro-2H-pyran and, in Example 8, 529.9 weight parts of ethyl vinyl ether was dropped into the mixture at a constant rate in 1.5 hours from the dropping funnel. When the dropping was finished, the mixture was kept at 35° C. under stirring for further 4 hours. Then, 21 weight parts of sodium bicarbonate were added to the mixture and the reaction in the mixture was kept for 5 hours. When the reaction was finished, sodium bicarbonate was removed by filtration and the remaining vinyl ether compound was removed by distillation in vacuo. Two kinds of α,β-unsaturated compounds were prepared in the following yields: Example 7 (1): 92.3 weight %, Example 8 (1): 93.3 weight %.

(2) Preparation of thermal latent hydroxyl compounds

Into a flask, equipped with a thermometer, a reflux condenser, a stirrer and a dropping funnel, an initial portion of solvent which was xylene as shown in Table 6 was charged and kept at 100° C. under heating and stirring. A mixture of monomers and a polymerization initiator shown in Table 6 ('composition of dropped mixture') was added by dropping to the solvent at 100° C. at a constant rate for 2 hours. When the addition of the dropping component was finished, the mixture was kept at 100° C. for further 30 minutes and, then, an additional amount of initiator solution shown in Table 6 ('additional catalyst') was added to the mixture. The mixture was kept at 100° C. for 2 hours before finishing the reaction and finally the thermal latent hydroxyl compounds [7] and [8] were prepared.

Results of Examples 1 through 8 are summarized in Table 7.

COMPARATIVE EXAMPLE OF PREPARATION OF MATERIAL 1

One compound (A), A-7, was prepared by the following method. Into a four-necked flask equipped with a thermometer, a reflux condenser, a stirrer and a dropping funnel, 200 weight parts of xylene were charged and kept at 80° C. under heating and stirring. A mixture having the following composition was dropped at a constant rate from the dropping funnel in 2 hours at 80° C. When the dropping was finished, the mixture was kept at 80° C. for further 1 hour and 57.0 weight parts of n-butyl acetate and 3.0 weight parts of 2,2'-azo-bis-isobutyronitrile were added. After the mixture was kept at 80° C. for further 4 hours, the compound A-7 having 50.3 weight % of non-volatile matter and Gardener viscosity at 25° C. V-W.

| | |
|---|---|
| 2-hydroxyethyl methacrylate | 130.0 weight parts |
| n-butyl methacrylate | 100.0 weight parts |
| methyl methacrylate | 175.1 weight parts |
| 2-ethylhexyl acrylate | 94.5 weight parts |
| n-butyl acetate | 217.5 weight parts |
| 2,2'-azo-bis-isobutyronitrile | 22.5 weight parts |

EXAMPLES 9 THROUGH 19

These examples show application of the composition to one coat solid color coating.

(1) Preparation of coating compositions

Components summarized in Table 8 were utilized for the preparation of the coating compositions. A part of or all materials were charged into a sand mill and dispersed until the particle size decreased to not more than 10 μm. Materials excluding following components were charged into the sand mill: the compound A-1 in Example 9, the compound A-2 in Example 10, the compound A-3 in Examples 11 and 12, KR-214 ® in Example 13, Cymel 303 ® in Example 14, the compound B-7 in Example 15, Coronate EH ® in Example 16 and Denacol EX-421 ® in Example 19. All the raw materials were charged into the sand mill in Examples 17 and 18. In Examples 9 through 16 and Example 19, one component coating compositions were prepared by adding the materials which were not treated by the sand mill to the materials treated by the sand mill. In Examples 17 and 18, the materials treated by the sand mill were utilized for the preparation of one component coating composition. The coating compositions prepared were diluted by a thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 9 show that the increase of viscosity was very slight in all cases and that the coating compositions had excellent storage stability.

(2) Preparation of test pieces

Cationic electro coating paint AQUA No. 4200 ® (a product of Nippon Oil and Fats Co., Ltd.) was applied by electrodeposition to a soft steel plate treated with zinc phosphate in an amount to form a film having dried thickness of 20 μm and the coated plate was baked at 175° C. for 25 minutes. Intermediate coating paint EPICO No. 1500CP Sealer ® (a product of Nippon Oil and Fats Co., Ltd.) was applied to the prepared plate by air spraying in an amount to form a film having dried thickness of 40 μm and the plate was baked at 140° C. for 30 minutes to obtain a base test piece.

The raw coating compositions prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 9.

Results of the evaluation of coatings are shown in Table 9. In all cases, uniform coating having good gloss were prepared. All the coatings showed excellent acid resistance, impact resistance, weathering resistance and hardness.

Weathering resistance was evaluated by exposure for 1000 hours.

COMPARATIVE EXAMPLES 1 AND 2

Components listed in Table 10 were utilized for the preparation of the coating compositions. The components were dispersed and made into coating compositions by the same method as in Examples 9 through 19. The materials excluding pentaerythritol tetrakis(thioglycolate) in Comparative example 1 and the materials excluding Coronate EH ® in Comparative examples 2 were dispersed by using a sand mill and utilized for preparation of coating materials.

The coating materials thus prepared were evaluated on the storage stability in the same method as in Examples 9 through 19. In the both examples, viscosity increased remarkably with the period of storage. In the case of Comparative example 1, the coating material was gelatinized after 5 days because neither thiol group or epoxy group was blocked to prevent crosslinking reaction of the both functional groups under the storage condition. In the case of Comparative example 2, the coating compositions were gelatinized after 3 days because neither hydroxyl group or isocyanate group was blocked to prevent crosslinking reaction of the both functional groups under the storage condition.

EXAMPLES 20 THROUGH 23

These examples show application of the composition to two coat one bake metallic color coating.

(1) Preparation of clear coating compositions

One component clear coating compositions were prepared by mixing raw materials shown in Table 11. The clear coating compositions prepared were evaluated on storage stability by the same method as in Examples 9 through 19. Increase of viscosity was very slight in all cases tested and the coating compositions were shown to have excellent storage stability as shown in Table 12.

(2) Preparation of test pieces

Raw coating compositions thus prepared were diluted in the same method as in Examples 9 through 19. Base test pieces were also prepared in the same method as in Examples 9 through 19. A silver metallic base coating composition, BELCOAT No. 6000 ® (a product of Nippon Oil and Fats Co., Ltd.) was applied to the base test piece by air spraying with interval of 1 minute 30 seconds in 2 stages in an amount to form a film having dried thickness of 15 μm. After the test pieces were set at 20° C. for 3 minutes, the diluted clear coating compositions were coated by air spray coating and the test pieces were cured in the condition shown in Table 12 to prepare final test pieces.

Results of the evaluation listed in Table 12 show that, in all cases, uniform coating having good gloss were prepared and the coating showed excellent acid resistance, impact resistance, weathering resistance and hardness.

Weathering resistance was evaluated by exposure for 3000 hours.

COMPARATIVE EXAMPLE 3

Clear coating composition was prepared by using material of the following composition and evaluated on the storage stability in the same method as in Examples 9 through 19. Viscosity increased remarkably with the period of storage, leading finally to gellation after 3 days, because neither hydroxyl group or isocyanate group was blocked to prevent crosslinking reaction of the both functional groups under the storage condition.

| compound A-7 | 100.0 weight parts |
| Coronate EH ® | 20.0 weight parts |
| Modaflow ® | 0.1 weight parts |
| xylene | 5.0 weight parts |
| n-butyl acetate | 1.0 weight parts |

EXAMPLES 24 THROUGH 34

These examples show application of the composition to one coat solid color coating.

(1) Preparation of coating compositions

Components summarized in Table 13 were utilized for the preparation of the coating compositions. A part of or all materials were charged into a sand mill and dispersed until the particle size decreased to not more than 10 μm. Materials excluding following components were charged into the sand mill: the compound A-1 in Example 24, the compound A-2 in Example 25, the compound A-3 in Examples 26 and 27, KR-214 ® in Example 28, Cymel 303 ® in Example 29, the compound B-7 in Example 30, Coronate EH ® in Example 31 and Denacol EX-421 ® in Example 34. All the raw materials were charged into the sand mill in Examples 32 and 33. In Examples 24 through 31 and Example 34, one component coating compositions were prepared by adding the materials which were not treated by the sand mill to the materials treated by the sand mill. In Examples 32 and 33, the materials treated by the sand mill were utilized for the preparation of one component coating compositions. The coating compositions prepared were diluted by a thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 14 show that the increase of viscosity was very slight in all cases and that the coating compositions had excellent storage stability.

(2) Preparation of test pieces

Cationic electro coating paint AQUA No. 4200 ® (a product of Nippon Oil and Fats Co., Ltd.) was applied by electrodeposition to a soft steel plate treated with zinc phosphate in an amount to form a film having dried thickness of 20 µm and the coated plate was baked at 175° C. for 25 minutes. Intermediate coating paint EPICO No. 1500CP Sealer ® (a product of Nippon Oil and Fats Co., Ltd.) was applied to the prepared plate by air spraying in an amount to form a film having dried thickness of 40 µm and the plate was baked at 140° C. for 30 minutes to obtain a base test piece.

The raw coating compositions prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 14.

Results of the evaluation of coatings are shown in Table 14. In all cases, uniform coating having good gloss were prepared. All the coatings showed excellent acid resistance, impact resistance, weathering resistance and hardness.

Weathering resistance was evaluated by exposure for 1000 hours.

COMPARATIVE EXAMPLE 4 THROUGH 6

Components listed in Table 15 were utilized for the preparation of the coating compositions. The components were dispersed and made into coating compositions in the same method as in Examples 24 through 30. The materials excluding pentaerythritol tetrakis(thioglycolate) in Comparative example 4 and the materials excluding Coronate EH ® in Comparative examples 5 and 6 were dispersed by using a sand mill and utilized for preparation of coating compositions.

The coating compositions thus prepared were evaluated on the storage stability in the same method as in Examples 24 through 34. In the both examples, viscosity increased remarkably with the period of storage. In the case of Comparative example 4, the coating material was gelatinized after 5 days because neither thiol group or epoxy group was blocked to prevent crosslinking reaction of the both functional groups under the storage condition. In the case of Comparative example 5, the coating material was gelatinized after 3 days because neither hydroxyl group or isocyanate group was blocked to prevent crosslinking reaction of the both functional groups under the storage condition.

Test pieces were prepared and evaluated by utilizing the coating compositions prepared above by the same method as in Example 24 through 34. The results are shown in Table 16. The properties of the coating of Comparative example 6 cured at 120° C. was inferior to the coating of Example 23 because thermal latent acid catalyst was not utilized in Comparative example 6.

Weathering resistance was evaluated by exposure for 1000 hours.

EXAMPLES 35 THROUGH 41

These examples show the application of the composition to a two coat one bake metallic color coating.

(1) Preparation of clear coating compositions

One component clear coating compositions were prepared by mixing raw materials shown in Table 17.

The clear coating compositions prepared were evaluated on storage stability by the same method as in Example 24 through 34. Increase of viscosity was very slight in all cases tested and the coating compositions were shown to have excellent storage stability as shown in Table 18.

(2) Preparation of test pieces

Raw coating compositions thus prepared were diluted in the same method as in Examples 24 through 34. Base test pieces were also prepared in the same method as in Examples 24 through 34. A silver metallic base coating composition, BELCOAT No. 6000 ® (a product of Nippon Oil and Fats Co., Ltd.) was applied to the base test piece by air spraying with interval of 1 minute 30 seconds in 2 stages in an amount to form a film having dried thickness of 15 µm. After the test pieces were set at 20° C. for 3 minutes, the diluted clear coating compositions were applied by air spray coating and the test pieces were cured in the condition shown in Table 18 to prepare final test pieces.

Results of the evaluation listed in Table 18 show that, in all cases, uniform coating films having good gloss were prepared and the coating showed excellent acid resistance, impact resistance, weathering resistance and hardness.

Weathering resistance was evaluated by exposure for 3000 hours.

COMPARATIVE EXAMPLES 7 AND 8

Components listed in Table 19 were utilized for the preparation of the clear coating compositions and the clear coating compositions prepared were evaluated on the storage stability in the same way as in Examples 24 through 34. Viscosity increased remarkably with the period of storage, leading finally to gellation after 3 days, because neither hydroxyl group or isocyanate group was blocked to prevent crosslinking reaction of the both functional groups under the storage condition in the case of Comparative example 7.

Test pieces were prepared and evaluated by utilizing the coating materials prepared above by the same method as in Example 35 through 41. The results are shown in Table 20. Properties of the coating of Comparative example 8 cured at 120° C. was inferior to the coating of Example 36 because thermal latent acid catalyst was not utilized in Comparative example 8.

Weathering resistance was evaluated by exposure for 3000 hours.

EXAMPLES 42 THROUGH 50

These examples show the application of the composition to a two coat one bake metallic color coating.

(1) Preparation of clear coating compositions

One component clear coating compositions were prepared by mixing raw materials shown in Table 21. The coating compositions prepared were diluted by a thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 14 show that the increase of viscosity was very slight in all cases and that the coating compositions had excellent storage stability.

(2) Preparation of test pieces

Cationic electro coating paint AQUA No. 4200 ® (a product of Nippon Oil and Fats Co., Ltd.) was applied by electrodeposition to a soft steel plate treated with zinc phosphate in an amount to form a film having dried thickness of 20 μm and the coated plate was baked at 175° C. for 25 minutes. Intermediate coating paint EPICO No. 1500CP Sealer ® (a product of Nippon Oil and Fats Co., Ltd.) was applied to the prepared plate by air spraying in an amount to form a film having dried thickness of 40 μm and the plate was baked at 140° C. for 30 minutes to obtain a base test piece.

A silver metallic base coating composition, BEL-COAT No. 6000 ® (a product of Nippon Oil and Fats Co., Ltd.) was applied to the base test piece by air spraying with interval of 1 minute 30 seconds in 2 stages in an amount to form a film having dried thickness of 15 μm. After the test pieces were set at 20° C. for 3 minutes, the raw clear coating compositions of (1) which were diluted to spraying viscosity (25 seconds by Ford cup No. 4 at 20° C.) were applied by air spray coating and the test pieces were cured in the condition shown in Table 22 to prepare final test pieces.

Results of the evaluation listed in Table 22 show that, in all cases, uniform coating films having good gloss were prepared and the coating showed excellent acid resistance, impact resistance, weathering resistance and hardness.

Weathering resistance was evaluated by exposure for 3000 hours.

COMPARATIVE EXAMPLES 9 AND 10

Clear coating compositions were prepared by using materials of the compositions shown in Table 23 and evaluated on the storage stability in the same method as in Examples 42 through 50. In Comparative example 9, the coating composition gelatinized after 3 days because the coating compositions did not utilize a thermal latent hydroxyl compound unlike Example 45. In Comparative example 10, the coating composition gelatinized after 5 days because the coating composition did not utilize a thermal latent thiol compound unlike Example 47.

EXAMPLES 51 THROUGH 53

These examples show application of the composition to two coat one bake metallic color coating.

(1) Preparation of clear coating compositions

One component clear coating compositions were prepared by mixing raw materials shown in Table 24. The coating compositions prepared were diluted by a thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 25 show that the increase of viscosity was very slight in all cases and that the coating compositions had excellent storage stability.

(2) Preparation of test pieces

Silver metallic base coating composition, BELCOAT No. 6000 ® (a product of Nippon Oil and Fats Co., Ltd.) was applied to the base test piece, which was prepared by the same method as in Examples 9 through 19 (2) with application of intermediate coating, by air spraying with interval of 1 minute 30 seconds in 2 stages in an amount to form a film having dried thickness of 15 μm. After the test pieces were set at 20° C. for 3 minutes, the raw clear coating compositions of (1) which were diluted to spraying viscosity (25 seconds by Ford cup No. 4 at 20° C.) applied by air spray coating and the test pieces were cured in the condition shown in Table 25 to prepare final test pieces.

Results of the evaluation listed in Table 25 show that, in all cases, uniform coating films having good gloss were prepared and the coating showed excellent acid resistance, impact resistance, weathering resistance and hardness.

Weathering resistance was evaluated by exposure for 3000 hours.

While the invention has been particularly shown and described with reference to preferred embodiments thereof it will be understood by those skilled in the art that the foregoing and other changes in form and details can be made therein without departing from the spirit and scope of the invention.

To summarize the advantages obtained by the invention, the thermosetting composition of the invention are excellent in storage stability and give cured products having excellent chemical properties, physical properties and weathering resistance. They are favorably utilized in coating compositions, ink, adhesive and molded plastics.

The thermal latent hydroxyl compounds and thermal latent thiol compounds of the invention are favorably utilized to provide the thermosetting compositions which give the above excellent characteristics at relatively low curing temperature and can be utilized as the one component thermosetting compositions. The thermal latent hydroxyl compounds and thermal latent thiol compounds are efficiently prepared by the method of preparation of the invention.

TABLE 1

| Example of preparation of material compound (A) | | 1<br>A-1 | 2<br>A-2 | 3<br>A-3 |
|---|---|---|---|---|
| | OH or SH compound[1] | | | |
| composition of the initial material, weight part | Praccel 305 | 1279.4 | — | — |
| | K-flex 188-50 | — | 1671.4 | — |
| | pentaerythritol tetrakis (thioglycolate) | — | — | 833.0 |
| | hydrochoric acid, 35 weight % | 1.8 | 1.7 | 1.5 |
| vinyl ether, weight part | 3,4-dihydro-2H-pyran | 618.2 | — | — |
| | ethyl vinyl ether | — | 529.9 | — |
| | butyl vinyl ether | — | — | 736.5 |
| yield, weight % | | 91.4 | 92.3 | 90.5 |

[1] compound comprising polyfunctional hydroxyl groups or compound comprising polyfunctional thiol groups.

TABLE 2

| Example of preparation of material compound A | | 4<br>A-4 | 5<br>A-5 | 6<br>A-6 |
|---|---|---|---|---|
| xylene | | 200.0 | 200.0 | 200.0 |
| composition of dropped mixture, weight part | α,β-unsaturated compound A-4(a) | 231.9 | — | — |
| | α,β-unsaturated compound A-5(a) | — | 216.5 | — |
| | α,β-unsaturated compound A-6(a) | — | — | 250.5 |
| | n-butyl methacrylate | 100.0 | 100.0 | 100.0 |
| | methyl methacrylate | 175.1 | 175.1 | 175.1 |
| | 2-ethyl hexyl acrylate | 94.9 | 94.9 | 94.9 |
| | n-butyl acetate | 114.8 | 130.6 | 95.9 |
| | AIBN | 23.3 | 22.9 | 24.0 |
| additional catalyst, weight part | n-butyl acetate | 57.0 | 57.0 | 57.0 |
| | AIBN | 3.0 | 3.0 | 3.0 |
| properties | non-volatile matter, weight % | 58.3 | 57.4 | 60.3 |

TABLE 2-continued

| Example of preparation of material compound A | 4 A-4 | 5 A-5 | 6 A-6 |
|---|---|---|---|
| xylene | 200.0 | 200.0 | 200.0 |
| Gardner viscosity | P-Q | S-T | T-U |

TABLE 3

| Example of preparation of material compound (B) | | 7 B-1 | 8 B-2 | 9 B-3 | 10 B-4 | 11 B-5 |
|---|---|---|---|---|---|---|
| composition of dropped mixture, weight part | IAAn | 22.40 | — | — | — | — |
| | TMSPMA | — | 16.60 | — | — | — |
| | MAGME ® | — | — | 19.22 | — | — |
| | IEM | — | — | — | 31.00 | — |
| | GMA | — | — | — | — | 28.40 |
| | BMA | 20.00 | 20.00 | 20.00 | 20.00 | 20.00 |
| | MMA | 28.87 | 51.19 | 33.80 | 25.10 | 34.43 |
| | EHA | 28.73 | 12.21 | 28.90 | 23.90 | 17.17 |
| | AIBN | 2.00 | 2.00 | 2.00 | 2.00 | 2.00 |
| | n-buty acetate | — | 54.0 | 52.08 | 54.00 | 54.00 |
| | dioxane | 54.00 | — | — | — | — |
| additional catalyst, weight part | n-butyl acetate | 3.80 | 3.80 | 3.80 | 3.80 | 3.80 |
| | AIBN | 0.20 | 0.20 | 0.20 | 0.20 | 0.20 |
| properties | non-volatile matter, weight % | 50.3 | 51.0 | 50.2 | 51.3 | 50.2 |
| | Gardener viscosity | X-Y | S-T | V-W | R | V |

TABLE 4

| Example of preparation of material compound (D) | | 14 D-1 | 15 D-2 | 16 D-3 |
|---|---|---|---|---|
| n-butyl acetate, weight parts | | 40.00 | 40.00 | 40.00 |
| component of dropped mixture, weight part | compound A-4(a) | 23.19 | — | — |
| | compound A-5(a) | — | 21.65 | — |
| | compound A-6(a) | — | — | 25.05 |
| | 2-isocynatoethyl methacrylate | 15.50 | — | — |
| | methacryloyloxy trimethoxysilane | — | 8.30 | — |
| | itaconic anhydride | — | — | 11.20 |
| | BMA | 20.00 | 20.00 | 20.00 |
| | MMA | 32.63 | 43.11 | 31.95 |
| | EHA | 18.87 | 15.59 | 23.85 |
| | dioxane | — | — | 39.45 |
| | xylene | 41.31 | 42.85 | — |
| | AIBN | 4.50 | 4.50 | 4.50 |
| additional catalyst, weight part | n-butyl acetate | 3.80 | 3.80 | 3.80 |
| | AIBN | 0.20 | 0.20 | 0.20 |

TABLE 5

| Example thermal latent hydroxyl or thiol compound | | 1 [1] | 2 [2] | 3 [3] | 4 [4] | 5 [5] | 6 [6] |
|---|---|---|---|---|---|---|---|
| composition of charged mixture, weight part | Praccel E-488 ® | 387.6 | — | — | — | — | — |
| | K-Flex 188-50 ® | — | 477.5 | — | — | — | — |
| | Flexorez UD-320 ® | — | — | 320.6 | — | — | — |
| | polyol compound A | — | — | — | 695.6 | — | — |
| | polyol compound B | — | — | — | — | 492.2 | — |
| | pentaerythritol tetrakis (thioglycolate) | — | — | — | — | — | 476.0 |
| | hydrochloric acid 35 weight % | 0.6 | 0.5 | 0.6 | 0.8 | 0.8 | 0.8 |
| vinyl ether, weight part | ethyl vinyl ether | 302.4 | 151.2 | — | — | — | — |
| | n-propy vinyl ether | — | — | — | — | 361.2 | — |
| | isobutyl vinyl ether | — | — | 210.0 | — | — | 420.9 |
| | 3,4-dihydro-2H-pyran | — | — | — | 264.6 | — | — |
| yield, weight % | | 93.4 | 92.3 | 91.8 | 93.0 | 92.7 | 90.6 |

TABLE 6

| Example thermal latent hydroxyl compound | | 7 [7] | 8 [8] |
|---|---|---|---|
| xylene, weight part | | 191.7 | 191.7 |
| component of dropped mixture, weight part | α,β-unsaturated compound 7 (1) | 231.9 | — |
| | α,β-unsaturated compound 8 (1) | — | 216.5 |
| | BMA | 100.0 | 100.0 |
| | MMA | 175.1 | 175.1 |
| | EHA | 94.9 | 94.9 |
| | n-hutyl acetate | 114.8 | 130.6 |
| | AIBN | 31.6 | 31.2 |
| additional catalyst, weight part | n-butyl acetate | 57.0 | 57.0 |
| | AIBN | 3.0 | 3.0 |
| non-volatile matter, weight % | | 58.5 | 57.7 |

TABLE 7

| Example | | 1 | 2 | 3 | 4 | 5 | 6 | 7 | 8 |
|---|---|---|---|---|---|---|---|---|---|
| properties of polyhydroxyl or polythiol compound | average number of functional group | 4 | 2 | 2 | 3 | 4 | 4 | 3.5 | 3.8 |
| | equivalent, g/mole | 97 | 239 | 160 | 232 | 123 | 119 | 500 | 500 |
| | number average molecular weight | 388 | 478 | 320 | 696 | 492 | 476 | 1750 | 1890 |
| blocking agent[1] | | EVE | EVE | IBVE | DHP | PVE | IBVE | DHP | EVE |
| solution of thermal latent hydroxyl or thiol compound | | [1] | [2] | [3] | [4] | [5] | [6] | [7] | [8] |
| effective component, weight % | | 56.5 | 73.2 | 58.3 | 68.1 | 55.6 | 49.0 | 49.8 | 50.1 |
| properties | non-volatile matter, weight % | 54.4 | 53.7 | 55.5 | | | | | |
| | Gardener viscosity | R | M-N | O-P | | | | | |

[1]EVE: ethyl vinyl ether
IBVE: isobutyl vinyl ether
DHP: 3,4-dihydro-2H-pyran
PVE: n-propyl vinyl ether

TABLE 8

| | Example | | | | | | | | | | |
|---|---|---|---|---|---|---|---|---|---|---|---|
| | 9 | 10 | 11 | 12 | 13 | 14 | 15 | 16 | 17 | 18 | 19 |
| Compounding recipe in weight parts | | | | | | | | | | | |
| compound A-1 | 26.7 | — | — | — | — | — | — | — | — | — | — |
| compound A-2 | — | 31.1 | — | — | — | — | — | — | — | — | — |

TABLE 8-continued

| | Example | | | | | | | | | | |
|---|---|---|---|---|---|---|---|---|---|---|---|
| | 9 | 10 | 11 | 12 | 13 | 14 | 15 | 16 | 17 | 18 | 19 |
| compound A-3 | — | — | 21.9 | 21.9 | — | — | — | — | — | — | — |
| compound A-4 | — | — | — | — | 100 | — | — | — | — | — | — |
| compound A-5 | — | — | — | — | — | 100 | 100 | — | — | — | — |
| compound A-6 | — | — | — | — | — | — | — | 100 | — | — | — |
| compound B-1 | 100 | — | — | — | — | — | — | — | — | — | — |
| compound B-2 | — | 100 | — | — | — | — | — | — | — | — | — |
| compound B-5 | — | — | 100 | — | — | — | — | — | — | — | — |
| compound B-6 | — | — | — | 100 | — | — | — | — | — | — | — |
| compound B-7 | — | — | — | — | — | — | 10.9 | — | — | — | — |
| compound D-1 | — | — | — | — | — | — | — | — | 100 | — | — |
| compound D-2 | — | — | — | — | — | — | — | — | — | 100 | — |
| compound D-3 | — | — | — | — | — | — | — | — | — | — | 100 |
| KR-214 ® | — | — | — | — | 49.0 | — | — | — | — | — | — |
| Cymel 303 ® | — | — | — | — | — | 21.9 | — | — | — | — | — |
| Coronate EH ® | — | — | — | — | — | — | — | 20.0 | — | — | — |
| EX-421 ® | — | — | — | — | — | — | — | — | — | — | 7.8 |
| titanium dioxide | 61.4 | 64.1 | 56.6 | 56.6 | 74.1 | 63.1 | 54.6 | 64.2 | 43.5 | 43.0 | 51.4 |
| Modaflow ® | 0.2 | 0.2 | 0.2 | 0.2 | 0.2 | 0.2 | 0.2 | 0.2 | 0.2 | 0.2 | 0.2 |
| 10% PTSA | 2.0 | 2.0 | 2.0 | 2.0 | 2.0 | 2.0 | 2.0 | 2.0 | 2.0 | 2.0 | 2.0 |
| 10% pyridine | 1.0 | 1.0 | 1.0 | 1.0 | 1.0 | 1.0 | 1.0 | 1.0 | 1.0 | 1.0 | 1.0 |
| xylene | 10 | 10 | 10 | 10 | 10 | 10 | 10 | 10 | 10 | 10 | 10 |
| n-butyl acetate | 2 | 2 | 2 | 2 | 2 | 2 | 2 | 2 | 2 | 2 | 2 |

TABLE 9

| | | Example | | |
|---|---|---|---|---|
| | | 9 | 10 | 11 |
| compound (A) | | A-1 | A-2 | A-3 |
| compound (B) | | B-1 | B-2 | B-5 |
| | | acid anhydride group | alkoxysilane group | epoxy group |
| compound (D) | | — | — | — |
| ratio of mixing solid components | (A) | 34.8 | 37.6 | 29.4 |
| | (B) | 65.2 | 62.3 | 70.6 |
| | (D) | — | — | — |
| storage stability at 50° C. | initial viscosity, poise | 1.0 | 1.0 | 1.0 |
| | viscosity after 30 days, poise | 1.1 | 1.2 | 1.3 |
| curing condition | | 120° C. 30 min / 140° C. 30 min | 120° C. 30 min / 140° C. 30 min | 120° C. 30 min / 140° C. 30 min |
| properties of coating[1)] | resistance to acid 1 | good  good | good  good | good  good |
| | resistance to acid 2 | good  good | good  good | good  good |
| | resistance to acid 3 | good  good | good  good | good  good |
| | impact resistance | good  good | good  good | good  good |
| | weathering resistance | 82% 85% | 89% 93% | 83% 85% |
| | Knoop hardness | 10.0 10.5 | 10.3 10.6 | 11.0 11.2 |

| | | Example | | |
|---|---|---|---|---|
| | | 12 | 13 | 14 |
| compound (A) | | A-3 | A-4 | A-5 |
| compound (B) | | B-6 | KR-214 | Cymel 303 |
| | | acryloyloxy group | silanol group | alkylated aminomethylol group |
| compound (D) | | — | — | — |
| ratio of mixing solid components | (A) | 29.4 | 63.0 | 72.8 |
| | (B) | 70.6 | 37.0 | 27.2 |
| | (D) | — | — | — |
| storage stability at 50° C. | initial viscosity, poise | 1.0 | 1.0 | 1.0 |
| | viscosity after 30 days, poise | 1.1 | 1.1 | 1.2 |
| curing condition | | 120° C. 30 min / 140° C. 30 min | 120° C. 30 min / 140° C. 30 min | 120° C. 30 min / 140° C. 30 min |
| properties of coating[1)] | resistance to acid 1 | good  good | good  good | good  good |

TABLE 9-continued

|  |  |  |  |  |  |  |  |
|---|---|---|---|---|---|---|---|
|  | resistance to acid 2 | good | good | good | good | good | good |
|  | resistance to acid 3 | good | good | good | good | good | good |
|  | impact resistance | good | good | good | good | good | good |
|  | weathering resistance | 84% | 86% | 90% | 94% | 84% | 87% |
|  | Knoop hardness | 10.8 | 11.0 | 10.2 | 10.7 | 9.8 | 10.3 |

|  |  | Example 15 | Example 16 | Example 17 |
|---|---|---|---|---|
| compound (A) |  | A-5 | A-6 | — |
| compound (B) |  | B-7 acetal group | Coronate EH isocyanate group | — |
| compound (D) |  | — | — | D-1 isocyanate group |
| ratio of mixing solid components | (A) | 84.0 | 75.0 | — |
|  | (B) | 16.0 | 25.0 | — |
|  | (D) | — | — | 100 |
| storage stability at 50° C. | initial viscosity, poise | 1.0 | 1.0 | 1.0 |
|  | viscosity after 30 days, poise | 1.1 | 1.3 | 1.3 |
| curing condition |  | 120° C. 30 min / 140° C. 30 min | 120° C. 30 min / 140° C. 30 min | 120° C. 30 min / 140° C. 30 min |
| properties of coating[1] | resistance to acid 1 | good / good | good / good | good / good |
|  | resistance to acid 2 | good / good | good / good | good / good |
|  | resistance to acid 3 | good / good | good / good | good / good |
|  | impact resistance | good / good | good / good | good / good |
|  | weathering resistance | 83% / 86% | 82% / 85% | 83% / 87% |
|  | Knoop hardness | 10.4 / 10.7 | 10.0 / 10.4 | 11.3 / 11.5 |

|  |  | Example 18 | Example 19 |
|---|---|---|---|
| Compound (A) |  | — | — |
| compound (B) |  | — | EX-421 epoxy group |
| compound (D) |  | D-2 alkoxy silane group | D-3 acid anhydride group |
| ratio of mixing solid components | (A) | — | — |
|  | (B) | — | 12.1 |
|  | (D) | 100 | 87.9 |
| storage stability at 50° C. | initial viscosity, poise | 1.0 | 1.0 |
|  | viscosity after 30 days, poise | 1.1 | 1.2 |
| curing condition |  | 120° C. 30 min / 140° C. 30 min | 120° C. 30 min / 140° C. 30 min |
| properties coating[1] | resistance to acid 1 | good / good | good / good |
|  | resistance to acid 2 | good / good | good / good |
|  | resistance to acid 3 | good / good | good / good |
|  | impact resistance | good / good | good / good |
|  | weathering resistance | 90% / 92% | 82% / 86% |
|  | Knoop hardness | 11.0 / 11.2 | 10.8 / 11.1 |

[1] good: no change was observed.

TABLE 10

|  | Comparative example | |
|---|---|---|
|  | 1 | 2 |
| Compounding recipe in weight parts | | |
| compound B-5 | 100 | — |
| compound A-7 | — | 100 |
| pentaerythritol tetrakis(thioglycolate) | 11.9 | — |
| Coronate EH ® | — | 20.0 |
| titanium dioxide JR-602 ® | 48.7 | 56.0 |
| Modaflow ® | 0.2 | 0.2 |
| xylene | 10 | 10 |
| n-butyl acetate | 2 | 2 |

TABLE 11

|  | Example | | | |
|---|---|---|---|---|
|  | 20 | 21 | 22 | 23 |
| Compound recipe in weight parts | | | | |
| compound A-1 | 26.7 | — | — | — |
| compound A-6 | — | 100 | — | — |
| compound B-1 | 100 | — | — | — |
| compound D-2 | — | — | 100 | — |
| compound D-3 | — | — | — | 100 |
| Coronate EH ® | — | 20 | — | — |
| Denacol EX-421 ® | — | — | — | 7.8 |
| Modaflow ® | 0.2 | 0.2 | 0.1 | 0.1 |
| 10% PTSA | 1.5 | 1.5 | 1.5 | 1.5 |
| 10% pyridine | 0.7 | 0.7 | 0.7 | 0.7 |
| xylene | 5 | 4 | 3 | 4 |
| n-butyl acetate | 1 | 1 | 1 | 1 |

TABLE 12

| | | Example | |
|---|---|---|---|
| | | 20 | 21 |
| compound (A) | | A-1 | A-6 |
| compound (B) | | B-1 acid anhydride group | Coronate EH isocyanate group |
| compound (D) | | — | — |
| ratio of mixing solid components | (A) | 34.8 | 75.0 |
| | (B) | 65.2 | 25.0 |
| | (D) | — | — |
| storage stability at 50° C. | initial viscosity, poise | 1.0 | 1.0 |
| | viscosity | 1.2 | 1.3 |

TABLE 12-continued

| | | | | | |
|---|---|---|---|---|---|
| | after 30 days, poise | | | | |
| curing condition | | 120° C. 30 min | 140° C. 30 min | 120° C. 30 min | 140° C. 30 min |
| properties of coating[1] | resistance to acid 1 | good | good | good | good |
| | resistance to acid 2 | good | good | good | good |
| | resistance to acid 3 | good | good | good | good |
| | impact resistance | good | good | good | good |
| | weathering resistance | good | good | good | good |
| | Knoop hardness | 10.3 | 10.7 | 9.9 | 10.5 |

| | | Example | |
|---|---|---|---|
| | | 22 | 23 |
| compound (A) | | — | — |
| compound (B) | | — | EX-421 epoxy group |
| compound (D) | | D-2 alkoxysilane group | D-3 acid anhydride group |
| ratio of mixing solid components | (A) | — | — |
| | (B) | — | 12.1 |
| | (D) | 100 | 87.9 |
| storage stability at 50° C. | initial viscosity, poise | 1.0 | 1.0 |
| | viscosity after 30 days, poise | 1.3 | 1.2 |
| curing condition | | 120° C. 30 min | 140° C. 30 min | 120° C. 30 min | 140° C. 30 min |
| properties of coating[1] | resistance to acid 1 | good | good | good | good |
| | resistance to acid 2 | good | good | good | good |
| | resistance to acid 3 | good | good | good | good |
| | impact resistance | good | good | good | good |
| | weathering resistance | good | good | good | good |
| | Knoop hardness | 10.6 | 10.9 | 10.0 | 10.2 |

[1] good: no change was observed.

TABLE 13

| Example | 24 | 25 | 26 | 27 | 28 | 29 | 30 | 31 | 32 | 33 | 34 |
|---|---|---|---|---|---|---|---|---|---|---|---|
| Compounding recipe in weight parts | | | | | | | | | | | |
| compound A-1 | 26.7 | — | — | — | — | — | — | — | — | — | — |
| compound A-2 | — | 31.1 | — | — | — | — | — | — | — | — | — |
| compound A-3 | — | — | 21.9 | 21.9 | — | — | — | — | — | — | — |
| compound A-4 | — | — | — | — | 100 | — | — | — | — | — | — |
| compound A-5 | — | — | — | — | — | 100 | 100 | — | — | — | — |
| compound A-6 | — | — | — | — | — | — | — | 100 | — | — | — |
| compound B-1 | 100 | — | — | — | — | — | — | — | — | — | — |
| compound B-2 | — | 100 | — | — | — | — | — | — | — | — | — |
| compound B-5 | — | — | 100 | — | — | — | — | — | — | — | — |
| compound B-6 | — | — | — | 100 | — | — | — | — | — | — | — |
| compound B-7 | — | — | — | — | — | — | 10.9 | — | — | — | — |
| compound D-1 | — | — | — | — | — | — | — | — | 100 | — | — |
| compound D-2 | — | — | — | — | — | — | — | — | — | 100 | — |
| compound D-3 | — | — | — | — | — | — | — | — | — | — | 100 |
| KR-214 ® | — | — | — | — | 49.0 | — | — | — | — | — | — |
| Cymel 303 ® | — | — | — | — | — | 21.9 | — | — | — | — | — |
| Coronate EH ® | — | — | — | — | — | — | — | 20.0 | — | — | — |
| EX-421 ® | — | — | — | — | — | — | — | — | — | — | 7.8 |
| titanium dioxide | 61.4 | 64.1 | 56.6 | 56.6 | 74.1 | 63.1 | 54.6 | 64.2 | 43.5 | 43.0 | 51.4 |
| Modaflow ® | 0.2 | 0.2 | 0.2 | 0.2 | 0.2 | 0.2 | 0.2 | 0.2 | 0.2 | 0.2 | 0.2 |
| 10% PTSA | 2.3 | — | — | — | — | — | — | — | — | 1.6 | — |
| 10% pyridine | 1.1 | — | — | — | — | — | — | — | — | 0.7 | — |
| C-1203 ® | — | 1.2 | — | — | — | — | — | — | — | — | 1.0 |

TABLE 13-continued

| Example | 24 | 25 | 26 | 27 | 28 | 29 | 30 | 31 | 32 | 33 | 34 |
|---|---|---|---|---|---|---|---|---|---|---|---|
| acid catalyst A | — | — | 2.1 | — | — | — | 2.0 | — | — | — | — |
| acid catalyst B | — | — | — | 2.1 | — | — | — | — | — | — | — |
| acid catalyst C | — | — | — | — | 5.6 | 4.7 | — | — | — | — | — |
| acid catalyst D | — | — | — | — | — | — | — | 4.0 | 2.7 | — | — |
| xylene | 10 | 10 | 10 | 10 | 10 | 10 | 10 | 10 | 10 | 10 | 10 |
| n-butyl acetate | 2 | 2 | 2 | 2 | 2 | 2 | 2 | 2 | 2 | 2 | 2 |

TABLE 14

| Example | | 24 | 25 | 26 | 27 | 28 | 29 |
|---|---|---|---|---|---|---|---|
| compound (A) | | A-1 | A-2 | A-3 | A-3 | A-4 | A-5 |
| compound (B) | | B-1 | B-2 | B-5 | B-6 | KR-214 | Cymel 303 |
| | | acid anhydride group | alkoxysilane group | epoxy group | acryloyloxy group | silanol group | alkylated aminomethylol group |
| compound (D) | | — | — | — | — | — | — |
| thermal latent catalyst (C) | | pyridine salt of PTSA | Vesturit Catalyst 1203 | 1-methylethyl ester of PTSA | 1-methylheptyl ester of PTSA | 1-methylethyl ester of DDBSA | 1-methylethyl ester of DDBSA |
| ratio of mixing solid components | (A) | 34.8 | 37.6 | 29.4 | 29.4 | 63.0 | 72.8 |
| | (B) | 65.2 | 62.3 | 70.6 | 70.6 | 37.0 | 27.2 |
| | (D) | — | — | — | — | — | — |
| content of (C), weight % = (C)/{(A) + (B) + (D)} × 100 | | 0.44 | 0.76 | 0.37 | 0.50 | 0.67 | 0.67 |
| storage stability at 50° C. | initial viscosity, poise | 1.0 | 1.0 | 1.0 | 1.0 | 1.0 | 1.0 |
| | viscosity after 30 days, poise | 1.2 | 1.3 | 1.3 | 1.2 | 1.3 | 1.3 |
| curing condition | | 120° C. 30 min / 140° C. 30 min | 120° C. 30 min / 140° C. 30 min | 120° C. 30 min / 140° C. 30 min | 120° C. 30 min / 140° C. 30 min | 120° C. 30 min / 140° C. 30 min | 120° C. 30 min / 140° C. 30 min |
| properties of coating[1)] | resistance to acid 1 | good / good | good / good | good / good | good / good | good / good | good / good |
| | resistance to acid 2 | good / good | good / good | good / good | good / good | good / good | good / good |
| | resistance to acid 3 | good / good | good / good | good / good | good / good | good / good | good / good |
| | impact resistance | good / good | good / good | good / good | good / good | good / good | good / good |
| | weathering resistance | 85% / 86% | 93% / 93% | 85% / 86% | 86% / 87% | 94% / 94% | 87% / 88% |
| | Knoop hardness | 11.3 / 11.6 | 10.2 / 10.4 | 11.5 / 11.5 | 10.8 / 10.9 | 10.2 / 10.4 | 10.8 / 10.9 |

| Example | | 30 | 31 | 32 | 33 | 34 |
|---|---|---|---|---|---|---|
| compound (A) | | A-5 | A-6 | — | — | — |
| compound (B) | | B-7 | Coronate EH | — | — | EX-421 |
| | | acetal group | isocyanate group | | | epoxy group |
| compound (D) | | — | — | D-1 | D-2 | D-3 |
| | | | | isocyanate group | alkoxysilane group | acid anhyride group |
| thermal latent catalyst (C) | | 1-methylethyl ester of PTSA | di-2-ethylhexyl phosphate | di-2-ethylhexyl phosphate | pyridine salt of PTSA | Vesturit Catalyst 1203 |
| ratio of mixing solid components | (A) | 84.0 | 75.0 | — | — | 12.1 |
| | (B) | 16.0 | 25.0 | — | — | 87.9 |
| | (D) | — | — | 100 | 100 | — |
| content of (C), weight % = (C)/{(A) + (B) + (D)} × 100 | | 0.37 | 0.50 | 0.50 | 0.44 | 0.76 |
| storage stability at 50° C. | initial viscosity, poise | 1.0 | 1.0 | 1.0 | 1.0 | 1.0 |
| | viscosity after 30 days, poise | 1.2 | 1.2 | 1.3 | 1.1 | 1.2 |
| curing condition | | 120° C. 30 min / 140° C. 30 min | 120° C. 30 min / 140° C. 30 min | 120° C. 30 min / 140° C. 30 min | 120° C. 30 min / 140° C. 30 min | 120° C. 30 min / 140° C. 30 min |
| properties of coating[1)] | resistance to acid 1 | good / good | good / good | good / good | good / good | good / good |
| | resistance to acid 2 | good / good | good / good | good / good | good / good | good / good |
| | resistance to acid 3 | good / good | good / good | good / good | good / good | good / good |
| | impact resistance | good / good | good / good | good / good | good / good | good / good |
| | weathering resistance | 86% / 87% | 85% / 88% | 87% / 87% | 92% / 92% | 86% / 89% |
| | Knoop hardness | 10.1 / 10.4 | 10.5 / 10.8 | 10.9 / 11.0 | 11.1 / 11.3 | 10.2 / 10.5 |

TABLE 14-continued hardness

[1] good: no change was observed.

TABLE 15

| Comparative example | 4 | 5 | 6 |
|---|---|---|---|
| Compounding recipe in weight parts | | | |
| compound B-5 | 100 | — | — |
| compound A-6 | — | — | 100 |
| compound A-7 | — | 100 | — |
| pentaerythritol tetrakis (thioglycolate) | 11.9 | — | — |
| Coronate EH ® | — | 20.0 | 20.0 |
| titanium dioxide JR-602 ® | 48.7 | 56.0 | 64.2 |
| Modaflow ® | 0.2 | 0.2 | 0.2 |
| xylene | 10 | 10 | 10 |
| n-butyl acetate | 2 | 2 | 2 |
| acid catalyst D | 3.0 | 3.5 | — |

TABLE 16

| Comparative example | | 4 | 5 | 6 |
|---|---|---|---|---|
| compound (A) | | pentaerythritol tetrakis (thioglycolate) | A-7 | A-6 |
| compound (B) | | B-5 epoxy group | Coronate EH isocyanate group | Coronate EH isocyanate group |
| thermal latent catalyst (C) | | di-2-ethylhexyl phosphate | di-2-ethylhexyl phosphate | — |
| ratio of mixing solid components | (A) | 19.2 | 71.4 | 75.0 |
| | (B) | 80.8 | 28.6 | 25.0 |
| content of (C), weight % = (C)/{(A) + (B)} × 100 | | 0.48 | 0.50 | — |
| storage stability at 50° C. | initial viscosity, poise | 1.0 | 1.0 | 1.0 |
| | viscosity after 30 days, poise | gel after 5 days | gel after 3 days | 1.1 |
| curing condition | | 120° C. 30 min / 140° C. 30 min | 120° C. 30 min / 140° C. 30 min | 120° C. 30 min / 140° C. 30 min |
| properties of coating[1] | resistance to acid 1 | good / good | good / good | good / good |
| | resistance to acid 2 | good / good | good / good | heavy stain / good |
| | resistance to acid 3 | good / good | good / good | cloudy / good |
| | impact resistance | good / good | good / good | crack / good |
| | weathering resistance | 84% / 85% | 85% / 87% | 78% / 85% |
| | Knoop hardness | 11.6 / 11.7 | 10.7 / 10.9 | 7.8 / 10.5 |

[1] good: no change was observed.

TABLE 17

| Example | 35 | 36 | 37 | 38 | 39 | 40 | 41 |
|---|---|---|---|---|---|---|---|
| Compounding recipe in weight parts | | | | | | | |
| compound A-1 | 26.7 | — | — | — | — | — | — |
| compound A-6 | — | 100.0 | — | — | 100.0 | 100.0 | 100.0 |
| compound B-1 | 100.0 | — | — | — | — | — | — |
| compound D-2 | — | — | 100.0 | — | — | — | — |
| compound D-3 | — | — | — | 100.0 | — | — | — |
| Coronate EH | — | 20.0 | — | — | 20.0 | 20.0 | 20.0 |
| Denacol EX-421 ® | — | — | — | 7.8 | — | — | — |
| Modaflow ® | 0.2 | 0.2 | 0.1 | 0.1 | 0.2 | 0.2 | 0.2 |
| 10% PTSA | 2.3 | — | — | — | — | — | — |
| 10% pyridine | 1.1 | — | — | — | — | — | — |
| xylene | 5 | 4 | 3 | 4 | 4 | 4 | 4 |
| n-butyl acetate | 1 | 1 | 1 | 1 | 1 | 1 | 1 |
| acid catalyst B | — | — | 1.5 | — | — | — | — |
| acid catalyst C | — | — | — | 3.9 | — | — | — |
| acid catalyst D | — | 4.0 | — | — | — | — | — |
| acid catalyst E | — | — | — | — | 4.0 | — | — |
| acid catalyst F | — | — | — | — | — | 3.2 | — |
| acid catalyst G | — | — | — | — | — | — | 8.0 |

TABLE 18

| Example | | 35 | 36 | 37 | 38 |
|---|---|---|---|---|---|
| compound (A) | | A-1 | A-6 | — | — |
| compound (B) | | B-1 acid anhydride group | Coronate EH isocyanate group | — | EX-421 epoxy group |
| compound (D) | | — | — | D-2 alkoxysilane group | D-3 acid anhydride group |
| thermal latent catalyst (C) | | pyridine salt of PTSA | di-2-ethylhexyl phosphate | 1-methylheptyl ester of PTSA | 1-methylethyl ester of DDBSA |
| ratio of mixing solid components | (A) | 34.8 | 75.0 | — | — |
| | (B) | 65.2 | 25.0 | — | 12.1 |
| | (D) | — | — | 100 | 87.9 |
| content of (C), weight % = (C)/{(A) + (B) + (D)} × 100 | | 0.44 | 0.50 | 0.50 | 0.67 |
| storage stability at 50° C. | initial viscosity, poise | 1.0 | 1.0 | 1.0 | 1.0 |
| | viscosity after 30 days, poise | 1.2 | 1.3 | 1.3 | 1.2 |
| curing condition | | 120° C. 30 min / 140° C. 30 min | 120° C. 30 min / 140° C. 30 min | 120° C. 30 min / 140° C. 30 min | 120° C. 30 min / 140° C. 30 min |
| properties of coating[1)] | resistance to acid 1 | good / good | good / good | good / good | good / good |
| | resistance to acid 2 | good / good | good / good | good / good | good / good |
| | resistance to acid 3 | good / good | good / good | good / good | good / good |
| | impact resistance | good / good | good / good | good / good | good / good |
| | weathering resistance | good / good | good / good | good / good | good / good |
| | Knoop hardness | 10.7 / 10.8 | 11.0 / 11.3 | 10.2 / 11.5 | 10.4 / 10.7 |

| Example | | 39 | 40 | 41 |
|---|---|---|---|---|
| compound (A) | | A-6 | A-6 | A-6 |
| compound (B) | | Coronate EH isocyanate group | Coronate EH isocyanate group | Coronate EH isocyanate group |
| compound (D) | | — | — | — |
| thermal latent catalyst (C) | | triethylamine salt of ZnCl$_2$ | SB-1[2)] | SB-2[3)] |
| ratio of mixing solid components | (A) | 75.0 | 75.0 | 75.0 |
| | (B) | 25.0 | 25.0 | 25.0 |
| | (D) | — | — | — |
| content of (C), weight % = (C)/{(A) + (B) + (D)} × 100 | | 0.50 | 2.00 | 2.00 |
| storage stability at 50° C. | initial viscosity, poise | 1.0 | 1.0 | 1.0 |
| | viscosity after 30 days, poise | 1.2 | 1.2 | 1.3 |
| curing condition | | 120° C. 30 min / 140° C. 30 min | 120° C. 30 min / 140° C. 30 min | 120° C. 30 min / 140° C. 30 min |
| properties of coating[1)] | resistance to acid 1 | good / good | good / good | good / good |
| | resistance to acid 2 | good / good | good / good | good / good |
| | resistance to acid 3 | good / good | good / good | good / good |
| | impact resistance | good / good | good / good | good / good |
| | weathering resistance | good / good | good / good | good / good |
| | Knoop hardness | 11.0 / 11.2 | 11.2 / 11.4 | 11.3 / 11.4 |

[1)]good: no change was observed
[2)]SB-1: 3-methyl-2-butynyl tetramethylenesulfonium hexafluoroantimonate;
[3)]SB-2: 4-methyoxybenzylpyridinium hexafluoroantimonate

TABLE 19

| | Comparative example | |
|---|---|---|
| | 7 | 8 |
| Compounding recipe in weight parts | | |
| compound A-6 | — | 100.0 |
| compound A-7 | 100.00 | — |
| Coronate EH ® | 20.0 | 20.0 |

TABLE 19-continued

|  | Comparative example | |
|---|---|---|
|  | 7 | 8 |
| Modaflow ® | 0.1 | 0.1 |
| xylene | 5.0 | 5.0 |
| n-butyl acetate | 1.0 | 1.0 |
| acid catalyst D | 3.5 | — |

TABLE 20

|  |  | Comparative example | |
|---|---|---|---|
|  |  | 7 | 8 |
| compound (A) |  | A-7 | A-6 |
| compound (B) |  | Coronate EH isocyanate group | Coronate EH isocyanate group |
| thermal latent catalyst (C) |  | di-2-ethylhexyl phosphate | — |
| ratio of mixing (A) solid components (B) |  | 75.0 25.0 | 75.0 25.0 |
| content of (C), weight % = (C)/{(A) + (B)} × 100 |  | 0.50 | — |
| storage stability at 50° C. | initial viscosity, poise | 1.0 | 1.0 |
|  | viscosity after 30 days, poise | gel after 3 days | 1.1 |
| curing condition |  | 120° C. 30 min | 140° C. 30 min | 120° C. 30 min | 140° C. 30 min |
| properties of coating[1] | resistance to acid 1 | good | good | stain | good |
|  | resistance to acid 2 | good | good | heavy stain | good |
|  | resistance to acid 3 | good | good | cloudy | good |
|  | impact resistance | good | good | fracture | good |
|  | weathering resistance | good | good | crack after 2400 hours | good |
|  | Knoop hardness | 11.3 | 11.5 | 8.2 | 10.8 |

[1] good: no change was observed

TABLE 21

|  | Example | | | | |
|---|---|---|---|---|---|
|  | 42 | 43 | 44 | 45 | 46 |
| Compounding recipe of clear coating material in weight parts | | | | | |
| compound [1][1] | 17.2 | — | — | — | — |
| compound [2][1] | — | 36.7 | — | — | — |
| compound [3][1] | — | — | 27.4 | — | — |
| compound [4][1] | — | — | — | 34.1 | — |
| compound [5][1] | — | — | — | — | 22.1 |
| compound [6][1] | — | — | — | — | — |
| compound [7][1] | — | — | — | — | — |
| compound [8][1] | — | — | — | — | — |
| compound B-1 | 100.0 | — | — | — | — |
| compound B-2 | — | 100.0 | — | — | — |
| compound B-3 | — | — | 200.0 | — | — |
| compound B-4 | — | — | — | 100.0 | 100.0 |
| compound B-5 | — | — | — | — | — |
| Coronate EH ® | — | — | — | — | — |
| Cymel 303 ® | — | — | — | — | — |
| acid catalyst B | 4.0 | 4.0 | 6.0 | 4.0 | 4.0 |
| acid catalyst E | — | — | — | — | — |
| Modaflow ® | 0.2 | 0.2 | 0.3 | 0.2 | 0.2 |
| xylene | 10 | 10 | 10 | 10 | 10 |
| n-butyl acetate | 2 | 2 | 2 | 2 | 2 |

|  | Example | | | |
|---|---|---|---|---|
|  | 47 | 48 | 49 | 50 |
| Compounding recipe of clear coating material in weight parts | | | | |
| compound [1][1] | — | — | — | — |
| compound [2][1] | — | — | — | — |
| compound [3][1] | — | — | — | — |
| compound [4][1] | — | — | — | — |
| compound [5][1] | — | — | — | — |
| compound [6][1] | 22.9 | — | — | — |
| compound [7][1] | — | 100.0 | — | 100.0 |
| compound [8][1] | — | — | 100.0 | — |
| compound B-1 | — | — | — | — |
| compound B-2 | — | — | — | — |
| compound B-3 | — | — | — | — |
| compound B-4 | — | — | — | — |
| compound B-5 | 100.0 | — | — | — |
| Coronate EH ® | — | 20.0 | — | 20.0 |
| Cymel 303 ® | — | — | 21.9 | — |
| acid catalyst B | 4.0 | 4.0 | 4.0 | — |
| acid catalyst E | — | — | — | 3.9 |
| Modaflow ® | 0.2 | 0.2 | 0.2 | 0.2 |
| xylene | 10 | 10 | 10 | 10 |
| n-butyl acetate | 2 | 2 | 2 | 2 |

[1] Thermal latent hydroxyl or thiol compound

TABLE 22

|  |  | Example | | |
|---|---|---|---|---|
|  |  | 42 | 43 | 44 |
| thermal latent hydroxyl or thiol compound |  | [1] | [2] | [3] |
| compound (B) |  | B-1 acid anhydride group | B-2 alkoxysilane group | B-3 alkylated amino-methylol group |
| mixing ratio mole/mole |  | 1/1 | 1/1 | 1/1 |
| thermal latent catalyst (C) |  | 1-methylheptyl ester of PTSA | 1-methylheptyl ester of PTSA | 1-methylheptyl ester of PTSA |
| storage stability at 50° C. | initial viscosity, poise | 1.0 | 1.0 | 1.0 |
|  | viscosity after 30 days, poise | 1.3 | 1.4 | 1.1 |
| curing condition |  | 120° C. 30 min | 140° C. 30 min | 120° C. 30 min | 140° C. 30 min | 120° C. 30 min | 140° C. 30 min |
| properties of coating[1] | resistance to acid 1 | good | good | good | good | good | good |
|  | resistance to acid 2 | good | good | good | good | good | good |
|  | resistance to acid 3 | good | good | good | good | good | good |
|  | impact resistance | good | good | good | good | good | good |
|  | weathering | good | good | good | good | good | good |

TABLE 22-continued

|  |  | | | | | | |
|---|---|---|---|---|---|---|---|
| | resistance | | | | | | |
| | Knoop hardness | 10.0 | 10.4 | 10.2 | 10.5 | 10.1 | 10.7 |

| | | Example | | | | | |
|---|---|---|---|---|---|---|---|
| | | 45 | | 46 | | 47 | |
| thermal latent hydroxyl or thiol compound compound (B) | | [4] B-4 isocyanate group | | [5] B-4 isocyanate group | | [6] B-5 epoxy group | |
| mixing ratio, mole/mole | | 1/1 | | 1/1 | | 1/1 | |
| thermal latent catalyst (C) | | 1-methylheptyl ester of PTSA | | 1-methylheptyl ester of PTSA | | 1-methylheptyl ester of PTSA | |
| storage stability at 50° C. | initial viscosity, poise | 1.0 | | 1.0 | | 1.0 | |
| | viscosity after 30 days, poise | 1.2 | | 1.3 | | 1.2 | |
| curing condition | | 120° C. 30 min | 140° C. 30 min | 120° C. 30 min | 140° C. 30 min | 120° C. 30 min | 140° C. 30 min |
| properties of coating[1] | resistance to acid 1 | good | good | good | good | good | good |
| | resistance to acid 2 | good | good | good | good | good | good |
| | resistance to acid 3 | good | good | good | good | good | good |
| | impact resistance | good | good | good | good | good | good |
| | weathering resistance | good | good | good | good | good | good |
| | Knoop hardness | 11.0 | 11.4 | 11.1 | 11.3 | 10.8 | 11.0 |

| | | Example | | | | | |
|---|---|---|---|---|---|---|---|
| | | 48 | | 49 | | 50 | |
| thermal latent hydroxyl or thiol compound compound (B) | | [7] Coronate EH isocyanate group | | [8] Cymel 303 alkylated amino-methylol group | | [7] Coronate EH isocyanate group | |
| mixing ratio, mole/mole | | 1/1 | | 0.33/1 | | 1/1 | |
| thermal latent catalyst (C) | | 1-methylheptyl ester of PTSA | | 1-methylheptyl ester of PTSA | | triethylamine salt of ZnCl$_2$ | |
| storage stability at 50° C. | initial viscosity, poise | 1.0 | | 1.0 | | 1.0 | |
| | viscosity after 30 days, poise | 1.3 | | 1.1 | | 1.2 | |
| curing condition | | 120° C. 30 min. | 140° C. 30 min. | 120° C. 30 min. | 140° C. 30 min. | 120° C. 30 min. | 140° C. 30 min. |
| properties of coating[1] | resistance to acid 1 | good | good | good | good | good | good |
| | resistance to acid 2 | good | good | good | good | good | good |
| | resistance to acid 3 | good | good | good | good | good | good |
| | impact resistance | good | good | good | good | good | good |
| | weathering resistance | good | good | good | good | good | good |
| | Knoop hardness | 11.1 | 11.4 | 10.8 | 11.2 | 11.0 | 11.3 | good: no change was observed.

TABLE 23

| | Comparative example | |
|---|---|---|
| | 9 | 10 |
| Compounding recipe of clear coating composition in weight parts | | |
| polyol compound A[1] | 24.5 | — |
| pentaerythritol tetrakis(thioglycolate) | — | 11.9 |
| compound B-4 | 100.0 | — |
| compound B-5 | — | 100.0 |
| acid catalyst B | 4.0 | 4.0 |
| Modaflow ® | 0.2 | 0.2 |
| xylene | 10.0 | 10.0 |
| n-butyl acetate | 2.0 | 2.0 |

[1]Example of preparation of material 20

TABLE 24

| | Example | | |
|---|---|---|---|
| | 51 | 52 | 53 |
| Compounding recipe of clear coating composition in weight parts | | | |
| thermal latent hydroxyl compound [7] | 100.0 | 100.0 | 100.0 |
| Cymel 303 ® | 3.6 | 3.6 | 3.6 |
| Coronate EH ® | 10.0 | — | — |
| compound B-2 | — | 50.0 | — |
| compound B-5 | — | — | 50.0 |
| acid catalyst B | 3.6 | 4.4 | — |
| acid catalyst E | — | — | 4.4 |
| Modaflow ® | 0.2 | 0.3 | 0.3 |
| xylene | 10 | 11 | 11 |
| n-butyl acetate | 2 | 3 | 3 |

TABLE 25

| | | Example | | |
|---|---|---|---|---|
| | | 51 | 52 | 53 |
| thermal latent hydroxyl or thiol compound | | [7] | [7] | [7] |
| compound (B) | | Cymel 303 alkylated aminomethylol group Coronate EH isocyanate group | Cymel 303 alkylated aminomethylol group B-2 alkoxysilane group | Cymel 303 alkylated aminomethylol group B-5 epoxy group |
| thermal latent catalyst (C) | | 1-methylheptyl ester of PTSA | 1-methylheptyl ester of PTSA | 1-methylheptyl ester of PTSA |
| storage stability at 50° C. | initial viscosity, poise | 1.0 | 1.0 | 1.0 |
| | viscosity after 30 days, poise | 1.3 | 1.2 | 1.1 |
| curing condition | | 120° C. 30 min / 140° C. 30 min | 120° C. 30 min / 140° C. 30 min | 120° C. 30 min / 140° C. 30 min |
| properties coating[1)] | resistance to acid 1 | good / good | good / good | good / good |
| | resistance to acid 2 | good / good | good / good | good / good |
| | resistance to acid 3 | good / good | good / good | good / good |
| | impact resistance | good / good | good / good | good / good |
| | weathering resistance | good / good | good / good | good / good |
| | Knoop hardness | 11.8 / 12.0 | 11.6 / 11.9 | 11.4 / 11.7 |

[1)]good: no change was observed.

What is claimed is:

1. A thermosetting composition which comprises:
(A) a compound having in the molecule two or more functional groups of the formula (I):

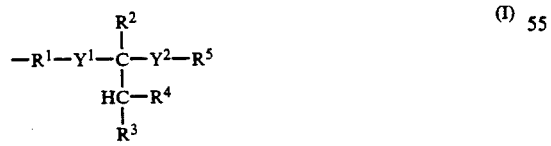

wherein $R^1$ is a bivalent organic group of 1 to 18 carbon atoms, $R^2$ is selected from the group consisting of a hydrogen atom and an organic group of 1 to 18 carbon atoms, $R^3$ is selected from the group consisting of a hydrogen atom and an organic group of 1 to 18 carbon atoms, $R^4$ is selected from the group consisting of a hydrogen atom and an organic group of 1 to 18 carbon atoms, $R^5$ is an organic group of 1 to 18 carbon atoms, $Y^1$ is selected from the group consisting of an oxygen atom and a sulfur atom, $Y^2$ is selected from the group consisting of an oxygen atom and a sulfur group, and $R^3$ and $R^5$ or $R^4$ and $R^5$ may be bonded with each other to form a heterocyclic structure which comprises $Y^2$ as the hetero atom component;

(B) a compound having in the molecule two or more of at least one reactive functional group selected from the group consisting of an epoxy group, a carboxyl group, an acid anhydride group, a silanol group, an alkoxysilane group, an isocyanate group, a cyclocarbonate group, a vinyl ether group, a vinyl thioether group, an acryloyloxy group, a methacryloyloxy group, an aminomethylol group, an alkylated aminomethylol group, an acetal group and a ketal group for forming a chemical bond with a hydroxyl group or a thiol group or both a hydroxyl group and a thiol group regenerated from the functional groups of the compound (A) by heating; and (C) a thermal latent acid catalyst which is activated during curing of the composition by heating to 50° to 200° C. and is at least one compound selected from the group consisting of a compound prepared by neutralizing a protonic acid with a Lewis base, a compound prepared by neutralizing a Lewis acid with a Lewis base, esters of sulfonic acid, esters of phosphoric acid, onium compounds and a mixture of a Lewis acid and a trialkyl phosphate.

2. The thermosetting composition as claimed in claim 1, wherein the compound (A) is a polymer of an α,β-unsaturated compound.

3. The thermosetting composition as claimed in claim 1, wherein the compound (A) is a polyester resin.

4. The thermosetting composition as claimed in claim 1, wherein the compound (B) is a polymer of an α,β-unsaturated compound.

5. The thermosetting composition as claimed in claim 1, wherein the compound (B) is a polyester resin.

6. The thermosetting composition as claimed in claim 1, wherein the compound (A) and the compound (B) are polymers of an α,β-unsaturated compound.

7. The thermosetting composition as claimed in claim 1, wherein the compound (A) and the compound (B) are polyester resins.

8. The thermosetting composition as claimed in claim 1, wherein the functional group for the compound (B) is a blocked isocyanate group.

9. The thermosetting composition as claimed in claim 1, wherein $R^1$ is selected from the group consisting of an alkylene group, an arylene group and an alkarylene group.

10. The thermosetting composition as claimed in claim 9, wherein $R^2$, $R^3$, $R^4$ and $R^5$ are each an organic group selected from the group consisting of an alkyl group, an aryl group and an alkaryl group.

11. The thermosetting composition as claimed in claim 1, wherein the thermal latent acid catalyst is in an amount of 0.01 to 10 parts by weight per 100 parts by weight of said compound (A) and said compound (B).

12. The thermosetting composition as claimed in claim 1, wherein the protonic acid is selected from the group consisting of a halogenocarboxylic acid, a sulfonic acid, a monoester of sulfuric acid, a monoester of phosphoric acid, a diester of phosphoric acid, an ester of polyphosphoric acid, a monoester of boric acid and a diester of boric acid; the Lewis base is selected from the group consisting of ammonia, monoethylamine, triethylamine, pyridine, piperidine, aniline, morpholine, cyclohexylamine, n-butylamine, monoethanolamine, diethanolamine, triethanolamine, trialkylphosphine, triaryl phosphine, trialkyl phosphite, triarylphosphite and trialkylphosphite; and the Lewis acid is selected from the group consisting of $BF_3$, $FeCl_3$, $SnCl_4$, $AlCl_3$ and $ZnCl_2$.

13. The thermosetting composition as claimed in claim 1, wherein compound (A) is a polymer of an α,β-unsaturated compound and compound (B) includes an isocyanate group.

14. The thermosetting composition as claimed in claim 1, wherein the catalyst (C) is an onium compound selected from the group consisting of $(R^{21}{}_3NR^{22})^+X^-$, $(R^{21}{}_2PR^{22})^+X^-$, $(R^{21}{}_2OR^{22})^+X^-$ and $(R^{21}{}_2SR^{22})^+X^-$ wherein $R^{21}$ is a group having 1 to 12 carbon atoms selected from the group consisting of an alkyl group, an alkenyl group, an aryl group, an alkaryl group, an alkanol group and a cycloalkyl group, wherein two $R^{21}$ groups may combine together with a heteroatom selected from the group consisting of N, P, O and S, $R^{22}$ is a hydrogen atom or a group having 1 to 12 carbon atoms selected from the group consisting of an alkyl group, an alkenyl group, an aryl group and an alkaryl group and $X^-$ is selected from the group consisting of $SbF_6^-$, $AsF_6^-$, $PF_6^-$ and $BF_4^-$.

15. The thermosetting composition as claimed in claim 1, wherein the catalyst (C) is an ester of sulfonic acid having the formula (7):

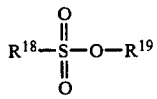  (7)

wherein $R^{18}$ is selected from the group consisting of an unsubstituted phenyl group, a substituted phenyl group, an unsubstituted naphthyl group, a substituted naphthyl group and an alkyl group and $R^{19}$ is a group of 3 to 18 carbon atoms selected from the group consisting of an alkyl group, an alkenyl group, an aryl group, an alkaryl group, an alkanol group and a saturated or unsaturated cycloalkyl group or a hydrocycloalkyl group which is bonded with the sulfonyloxy group through a primary or secondary carbon atom.

16. The thermosetting composition as claimed in claim 1, wherein the catalyst (C) is an ester of a phosphoric acid having the formula (8):

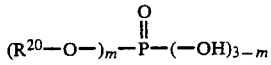  (8)

wherein $R^{20}$ is selected from the group consisting of an alkyl group having 3 to 10 carbon atoms, a cycloalkyl group having 3 to 10 carbon atoms and an aryl group having 6 to 10 carbon atoms and m is 1 or 2.

* * * * *